United States Patent
Ayling et al.

(10) Patent No.: US 8,683,192 B2
(45) Date of Patent: Mar. 25, 2014

(54) METHODS AND APPARATUS FOR USE IN QUANTUM KEY DISTRIBUTION

(75) Inventors: Stephen Gerard Ayling, Malvern (GB); Simon Robert Wiseman, Malvern (GB); Brian Sinclair Lowans, Malvern (GB)

(73) Assignee: Qinetiq, Hampshire (GB)

( * ) Notice: Subject to any disclaimer, the term of this patent is extended or adjusted under 35 U.S.C. 154(b) by 0 days.

(21) Appl. No.: 13/496,324

(22) PCT Filed: Sep. 28, 2010

(86) PCT No.: PCT/GB2010/001811
§ 371 (c)(1),
(2), (4) Date: Mar. 15, 2012

(87) PCT Pub. No.: WO2011/039503
PCT Pub. Date: Apr. 7, 2011

(65) Prior Publication Data
US 2012/0177201 A1    Jul. 12, 2012

Related U.S. Application Data

(60) Provisional application No. 61/251,393, filed on Oct. 14, 2009.

(30) Foreign Application Priority Data

Sep. 29, 2009    (GB) .................................. 0917060.6

(51) Int. Cl.
*H04L 29/06*    (2006.01)

(52) U.S. Cl.
USPC .......................................... 713/153; 380/256

(58) Field of Classification Search
USPC ........... 713/153; 380/255, 256, 277, 279, 280
See application file for complete search history.

(56) References Cited

U.S. PATENT DOCUMENTS

| | | |
|---|---|---|
| 3,704,996 A | 12/1972 | Borner et al. |
| 4,291,939 A | 9/1981 | Giallorenzi et al. |
| 4,691,984 A | 9/1987 | Thaniyavarn |
| 4,775,971 A | 10/1988 | Bergmann |
| 4,807,952 A | 2/1989 | Jaeger et al. |
| 5,150,436 A | 9/1992 | Jaeger et al. |

(Continued)

FOREIGN PATENT DOCUMENTS

| | | |
|---|---|---|
| EP | 0 583 115 A1 | 2/1994 |
| EP | 0 610 727 A1 | 8/1994 |

(Continued)

OTHER PUBLICATIONS

Apr. 9, 2012 Office Action issued in Japanese Patent Application No. 2009-527883 (with English Translation).

(Continued)

*Primary Examiner* — Edward Zee
(74) *Attorney, Agent, or Firm* — Oliff PLC

(57) ABSTRACT

Methods and apparatus for use in quantum key distribution (QKD) are described. A quantum QKD signal is generated at a source and transmitted through a fiber optic network to an endpoint, a key being agreed with communication over a classical QKD channel. The classical QKD channel contains additional information relevant to a network over which keys are distributed, and may be processed at nodes intermediate between the source and the endpoint.

17 Claims, 26 Drawing Sheets

(56) References Cited

U.S. PATENT DOCUMENTS

| | | | |
|---|---|---|---|
| 5,157,754 A | 10/1992 | Bierlein et al. | |
| 5,166,991 A | 11/1992 | Jaeger et al. | |
| 5,410,625 A | 4/1995 | Jenkins et al. | |
| 5,428,698 A | 6/1995 | Jenkins et al. | |
| 5,479,514 A | 12/1995 | Klonowski | |
| 5,481,636 A | 1/1996 | Fukuda et al. | |
| 5,566,257 A | 10/1996 | Jaeger et al. | |
| 5,757,912 A | 5/1998 | Blow | |
| 5,768,378 A | 6/1998 | Townsend et al. | |
| 5,878,142 A | 3/1999 | Caputo et al. | |
| 5,999,548 A | 12/1999 | Mori et al. | |
| 6,028,935 A | 2/2000 | Rarity et al. | |
| 6,145,079 A | 11/2000 | Mitty et al. | |
| 6,240,514 B1 | 5/2001 | Inoue et al. | |
| 6,278,548 B1 | 8/2001 | Shimano et al. | |
| 6,717,708 B2 | 4/2004 | Prosyk | |
| 6,798,795 B2 | 9/2004 | Yoo | |
| 6,806,986 B2 | 10/2004 | Asobe et al. | |
| 7,068,790 B1 | 6/2006 | Elliott | |
| 7,130,493 B2 | 10/2006 | Heaton et al. | |
| 7,155,078 B2 | 12/2006 | Welch et al. | |
| 7,162,107 B2 | 1/2007 | Bull et al. | |
| 7,181,114 B2 | 2/2007 | Lee et al. | |
| 7,242,775 B2 | 7/2007 | Vig et al. | |
| 7,242,821 B2 | 7/2007 | Bull et al. | |
| 7,248,695 B1 * | 7/2007 | Beal et al. | 380/256 |
| 7,274,791 B2 | 9/2007 | Van Enk | |
| 7,289,688 B2 | 10/2007 | Bull et al. | |
| 7,327,432 B2 | 2/2008 | Skjonnemand | |
| 7,430,295 B1 | 9/2008 | Pearson et al. | |
| 7,457,416 B1 | 11/2008 | Elliott | |
| 7,460,670 B1 | 12/2008 | Elliott | |
| 7,515,716 B1 | 4/2009 | Elliott | |
| 7,515,801 B2 | 4/2009 | McCaughan et al. | |
| 7,596,318 B2 | 9/2009 | Han et al. | |
| 7,627,126 B1 | 12/2009 | Pikalo et al. | |
| 7,646,873 B2 | 1/2010 | Lee et al. | |
| 7,706,535 B1 | 4/2010 | Pearson et al. | |
| 7,760,883 B2 | 7/2010 | Kuang | |
| 7,864,958 B2 | 1/2011 | Harrison et al. | |
| 7,865,048 B2 | 1/2011 | McCaughan et al. | |
| 8,081,270 B2 | 12/2011 | Lazarev | |
| 8,488,790 B2 | 7/2013 | Wellbrock et al. | |
| 2002/0025046 A1 | 2/2002 | Lin | |
| 2002/0060760 A1 | 5/2002 | Weiner | |
| 2002/0087862 A1 | 7/2002 | Jain et al. | |
| 2003/0169958 A1 | 9/2003 | Ridgway et al. | |
| 2003/0210912 A1 | 11/2003 | Leuthold et al. | |
| 2003/0214991 A1 | 11/2003 | Wiedmann et al. | |
| 2003/0223668 A1 | 12/2003 | Breukelaar et al. | |
| 2004/0032954 A1 | 2/2004 | Bonfrate et al. | |
| 2004/0034776 A1 | 2/2004 | Fernando et al. | |
| 2004/0086229 A1 | 5/2004 | Ahn et al. | |
| 2004/0109564 A1 | 6/2004 | Cerf et al. | |
| 2004/0184603 A1 | 9/2004 | Pearson et al. | |
| 2004/0184615 A1 | 9/2004 | Elliott et al. | |
| 2004/0252957 A1 | 12/2004 | Schmidt et al. | |
| 2005/0078826 A1 | 4/2005 | Takeuchi | |
| 2005/0134958 A1 | 6/2005 | Huang et al. | |
| 2005/0135620 A1 | 6/2005 | Kastella et al. | |
| 2005/0190921 A1 | 9/2005 | Schlafer et al. | |
| 2005/0249352 A1 | 11/2005 | Choi et al. | |
| 2005/0259825 A1 | 11/2005 | Trifonov | |
| 2005/0286723 A1 | 12/2005 | Vig et al. | |
| 2006/0002563 A1 | 1/2006 | Bussieres et al. | |
| 2006/0031828 A1 | 2/2006 | Won et al. | |
| 2006/0059343 A1 | 3/2006 | Berzanskis et al. | |
| 2006/0062392 A1 | 3/2006 | Lee et al. | |
| 2006/0067603 A1 | 3/2006 | Bull et al. | |
| 2006/0083379 A1 | 4/2006 | Brookner | |
| 2006/0104592 A1 | 5/2006 | Jenkins et al. | |
| 2006/0290941 A1 | 12/2006 | Kesler et al. | |
| 2007/0014415 A1 | 1/2007 | Harrison et al. | |
| 2007/0016534 A1 | 1/2007 | Harrison et al. | |
| 2007/0065154 A1 | 3/2007 | Luo et al. | |
| 2007/0065155 A1 | 3/2007 | Luo et al. | |
| 2007/0071245 A1 | 3/2007 | Kuang | |
| 2007/0074277 A1 | 3/2007 | Tofts et al. | |
| 2007/0076884 A1 | 4/2007 | Wellbrock et al. | |
| 2007/0101410 A1 | 5/2007 | Harrison et al. | |
| 2007/0104443 A1 | 5/2007 | Helmy | |
| 2007/0122097 A1 | 5/2007 | Schmidt et al. | |
| 2007/0123869 A1 | 5/2007 | Chin et al. | |
| 2007/0130455 A1 | 6/2007 | Elliott | |
| 2007/0133798 A1 | 6/2007 | Elliott | |
| 2007/0160201 A1 | 7/2007 | Blom et al. | |
| 2007/0177735 A1 | 8/2007 | Mimih et al. | |
| 2007/0192598 A1 | 8/2007 | Troxel et al. | |
| 2008/0003104 A1 | 1/2008 | Betlach | |
| 2008/0013738 A1 | 1/2008 | Tajima et al. | |
| 2008/0031456 A1 | 2/2008 | Harrison et al. | |
| 2008/0137858 A1 * | 6/2008 | Gelfond et al. | 380/256 |
| 2008/0144836 A1 | 6/2008 | Sanders et al. | |
| 2008/0147820 A1 | 6/2008 | Maeda et al. | |
| 2008/0175385 A1 | 7/2008 | Lee et al. | |
| 2008/0292095 A1 | 11/2008 | Vig et al. | |
| 2008/0317423 A1 | 12/2008 | Stepanov et al. | |
| 2009/0016736 A1 | 1/2009 | Beal et al. | |
| 2009/0074192 A1 | 3/2009 | Beal et al. | |
| 2009/0106551 A1 | 4/2009 | Boren et al. | |
| 2009/0175452 A1 | 7/2009 | Gelfond et al. | |
| 2009/0316910 A1 | 12/2009 | Maeda et al. | |
| 2010/0098252 A1 | 4/2010 | Kanter et al. | |
| 2010/0226659 A1 | 9/2010 | Nishioka et al. | |
| 2010/0290626 A1 | 11/2010 | Jenkins et al. | |
| 2010/0293380 A1 | 11/2010 | Wiseman et al. | |
| 2010/0299526 A1 | 11/2010 | Wiseman et al. | |
| 2010/0329459 A1 | 12/2010 | Wiseman et al. | |

FOREIGN PATENT DOCUMENTS

| | | |
|---|---|---|
| EP | 1 503 328 A1 | 2/2005 |
| EP | 1 605 287 A2 | 12/2005 |
| EP | 1 633 076 A1 | 3/2006 |
| EP | 1 643 663 A1 | 4/2006 |
| EP | 1 833 009 A1 | 9/2007 |
| EP | 1 848 142 A2 | 10/2007 |
| EP | 1 865 656 A1 | 12/2007 |
| EP | 1 891 677 A0 | 2/2008 |
| EP | 2 003 812 A2 | 12/2008 |
| EP | 2 081 317 A2 | 7/2009 |
| GB | 2 379 847 A | 3/2003 |
| GB | 2 397 452 A | 7/2004 |
| GB | 2 427 336 A | 12/2006 |
| GB | 2 453 471 A | 4/2009 |
| JP | A-63-313120 | 12/1988 |
| JP | A-04-233518 | 8/1992 |
| JP | 8-76148 A | 3/1996 |
| JP | A-2000-295175 | 10/2000 |
| JP | A-2004-520614 | 7/2004 |
| JP | A-2005-117511 | 4/2005 |
| JP | A-2005-268958 | 9/2005 |
| JP | A-2006-013573 | 1/2006 |
| JP | A-2007-500370 | 1/2007 |
| JP | A-2007-053591 | 3/2007 |
| JP | A-2007-129562 | 5/2007 |
| TW | A-2005-21509 | 7/2005 |
| WO | WO 92/11550 A1 | 7/1992 |
| WO | WO 92/11551 A1 | 7/1992 |
| WO | WO 92/11554 A1 | 7/1992 |
| WO | WO 92/11555 A1 | 7/1992 |
| WO | WO 95/07582 A1 | 3/1995 |
| WO | WO 97/44936 A1 | 11/1997 |
| WO | WO 02/15626 A1 | 2/2002 |
| WO | WO 02/057844 A1 | 7/2002 |
| WO | WO 03/015370 A2 | 2/2003 |
| WO | WO 03/065091 A2 | 8/2003 |
| WO | WO 2004/083915 A1 | 9/2004 |
| WO | WO 2004/083923 A1 | 9/2004 |
| WO | WO 2004/105289 A3 | 12/2004 |
| WO | WO 2005/012968 A1 | 2/2005 |
| WO | WO 2005/012970 A1 | 2/2005 |
| WO | WO 2006/031828 A2 | 3/2006 |
| WO | WO 2006/134290 A2 | 12/2006 |

(56) References Cited

FOREIGN PATENT DOCUMENTS

| WO | WO 2007/023286 A1 | 3/2007 |
|---|---|---|
| WO | WO 2007/105834 A1 | 9/2007 |
| WO | WO 2007/121587 A1 | 11/2007 |
| WO | WO 2007/123869 A2 | 11/2007 |
| WO | WO 2008/003104 A1 | 1/2008 |
| WO | WO 2008/032048 A1 | 3/2008 |
| WO | WO 2008/146395 A1 | 12/2008 |
| WO | WO 2009/001226 A3 | 12/2008 |
| WO | WO 2009/093034 A3 | 7/2009 |
| WO | WO 2009/093036 A2 | 7/2009 |
| WO | WO 2009/093037 A1 | 7/2009 |
| WO | WO 2009/095644 A1 | 8/2009 |
| WO | WO 2009/141586 A1 | 11/2009 |
| WO | WO 2009/141587 A1 | 11/2009 |
| WO | WO 2010/049673 A1 | 5/2010 |
| WO | WO 2010/064003 A1 | 6/2010 |
| WO | WO 2010/064004 A1 | 6/2010 |

OTHER PUBLICATIONS

Gordeev et al., "Tunable electro-optic polarization modulator for quantum key distribution applications," Optics Communications 234 (2004) pp. 203-210.
Haxha et al., "Analysis of polarization conversion in AlGaAs/GaAs electrooptic polarization converter," Optics Communications 262 (2006) pp. 47-56.
Jun. 1, 2011 International Search Report issued in Application No. PCT/GB2010/001811.
Jun. 1, 2011 Written Opinion issued in Application No. PCT/GB2010/001811.
Toliver et al., "Demonstration of 1550 nm QKD with ROADM-based DWDM Networking and the Impact of fiber FWM," 2007 Conference on Lasers and Electro-Optics, May 5-11, 2007, Baltimore, MD, Optical Society of America, May 6, 2007, pp. 1-2, XP031231023.
Bechmann-Pasquinucci et al., "Quantum key distribution with trusted quantum relay," May 12, 2005, pp. 1-13, <http://arxiv.org/PS_cache/quant-ph/pdf/0505/0505089v1.pdf5.
Bennett et al., "Quantum Cryptography: Public Key Distribution and Coin Tossing," International Conference on Computers, Systems & Signal Processing, Dec. 10-12, 1984, pp. 1-5, Bangalore, India.
Duligall et al., "Low cost and compact quantum key distribution," New Journal of Physics 8, 249, pp. 1-16, 2006.
Elliott, "Building the quantum network," New Journal of Physics 4, pp. 46.1-46.12, 2002, XP-002271991.
Fernandez et al., "Gigahertz Clocked Quantum Key Distribution in Passive Optical Networks," Leos Summer Topical Meetings, 2006 Digest of the Quebec City, Canada, Jul. 17, 2006, pp. 36-37, XP-010940123.
Fernandez et al., "Passive Optical Network Approach to Gigahertz-Clocked Multiuser Quantum Key Distribution," Journal of Quantum Electronics, vol. 43, No. 2, pp. 130-138, Feb. 2007.
Horikiri et al., "Quantum key distribution with a heralded single photon source," International Quantum Electronics Conference, 2005, pp. 1617-1618, Jul. 11, 2005.
Lee et al., "Quantum Authentication and Quantum Key Distribution Protocol," Jan. 11, 2006, pp. 1-8, <http://arxiv.org/PS_cache/quant-ph/pdf/0510/0510144v2.pdf>.
Rao et al., "Nonlinear frequency conversion in semiconductor optical waveguides using birefringent, modal and quasi-phase-matching techniques," Journal of Optics A: Pure and Applied Optics, vol. 6, pp. 569-584, 2004.
Karlsson et al., "Authority-based user authentication in quantum key distribution," Physical Review A, vol. 62, pp. 022305-1-022305-7, 2000, XP-002534291.
Kuhn, "A Quantum Cryptographic Protocal with Detection of Compromised Server," Quantum Information and Computation, vol. 5, No. 7, pp. 551-560, 2005, XP-002520284.
Kumavor et al., "Comparison of Four Multi-User Quantum Key Distribution Schemes Over Passive Optical Networks," Journal of Lightwave Technology, vol. 23, No. 1, pp. 268-276, Jan. 2005, XP-001227328.
Malis et al., "Improvement of second-harmonic generation in quantum-cascade lasers with true phase matching," Applied Physic Letters, vol. 84, No. 15, pp. 2721-2723, Apr. 12, 2004.
Mašanović et al., "Design and Performance of a Monolithically Integrated Widely Tunable All-Optical Wavelength Converter With Independent Phase Control," IEEE Photonics Technology Letters, vol. 16, No. 10, pp. 2299-2301, Oct. 2004.
Menezes, Handbook of Applied Cryptography, Chapter 13 Key Management Techniques, CRC Press LLC, pp. 547-553, 1997, XP-002520285.
Nambu et al., "BB84 Quantum Key Distribution System based on Silica-Based Planar Lightwave Circuits," Apr. 22, 2008, pp. 1-11, <http://arxiv.org/PS_cache/quant-ph/pdf/0404/0404015.pdf>.
Hwang et al., "Provably Secure Three-Party Authenticated Quantum Key Distribution Protocols," IEEE Transactions on Dependable and Secure Computing, vol. 4, No. 1, pp. 71-80, Jan.-Mar. 2007.
Mo et al., "Quantum key distribution network with wavelength addressing," Oct. 15, 2006, pp. 1-11, <http://arxiv.org/PS_cache/quant-ph/pdf/0610/0610096v2.pdf>, XP-002534290.
Nguyen et al., "802.11i Encryption Key Distribution Using Quantum Cryptography," Journal of Networks, vol. 1, No. 5, pp. 9-20, Sep./Oct. 2006, XP-002576733.
Moutzouris et al., "Second Harmonic Generation in GaAs/AlGaAs Waveguides With Femtosecond Pulses Near 1.55 μm Using Modal Phase Matching Technique," Lasers and Electro-Optics Europe, 2003 Conference Munich, Germany, Jun. 22-27, 2003, XP-010710252.
Jäger et al., "Modal dispersion phase matching over 7 mm length in overdamped polymeric channel waveguides," Applied Physics Letters, vol. 69, No. 27, pp. 4139-4141, Dec. 30, 1996.
Yin et al., "Integrated ARROW waveguides with hollow cores," Optics Express, vol. 12, No. 12, pp. 2710-2715, Jun. 14, 2004, XP-002363659.
Yariv, "Coupled-Mode Theory for Guided-Wave Optics," IEEE Journal of Quantum Electronics, vol. QE-9, No. 9, pp. 919-933, Sep. 1973.
Rahmatian, "An Ultrahigh-Speed AlGaAs-GaAs Polarization Converter Using Slow-Wave Coplanar Electrodes," IEEE Photonics Technology Letters, vol. 10, No. 5, pp. 675-677, May 1998.
Finlayson et al., "Polarization Conversion in Passive Deep-Etched GaAs/AlGaAs Waveguides," Journal of Lightwave Technology, vol. 24, No. 3, pp. 1425-1432, Mar. 2006, XP-002459136.
Grossard et al., "AlGaAs-GaAs Polarization Converter with Electrooptic Phase Mismatch Control," IEEE Photonics TechnologyLetters, vol. 13, No. 8, pp. 830-832, Aug. 2001.
Hall et al., "Optical Guiding and Electro-Optic Modulation in GaAs Epitaxial Layers," Optics Communications, vol. 1, No. 9, pp. 403-405, Apr. 1970.
Heaton et al., "Optimization of Deep-Etched, Single-Mode GaAs/AlGaAs Optical Waveguides Using Controlled Leakage into the Substrate," Journal of Lightwave Technology, vol. 17, No. 2, pp. 267-281, Feb. 1999.
Izuhara et al., "Low-voltage tunable TE/TM converter on ion-sliced lithium niobate thin film," Electronic Letters, vol. 39, No. 15, Jul. 24, 2003.
Schlak et al., "Tunable TE/TM-Mode Converter on (001)-InP-Substrate," IEEE Photonics Technology Letters, vol. 3, No. 1, pp. 15-16, Jan. 1991.
Wang et al., "High Speed III-V Electo optic Waveguide Modulators at λ = 1.3 μm," Journal of Lightwave Technology, vol. 6, No. 6, pp. 758-771, Jun. 1988.
Mar. 31, 2009 International Search Report issued in Application No. PCT/GB2009/000190.
Mar. 31, 2009 Written Opinion issued in Application No. PCT/GB2009/000190.
May 16, 2008 British Search Report issued in Application No. GB0801408.6.
Jul. 14, 2009 International Search Report issued in Application No. PCT/GB2009/000189.
Jul. 14, 2009 Written Opinion issued in Application No. PCT/GB2009/000189.
Aug. 3, 2010 International Preliminary Report on Patentability issued in Application No. PCT/GB2009/000179.

(56) References Cited

OTHER PUBLICATIONS

Jun. 2, 2009 International Search Report issued in Application No. PCT/GB2009/000179.
Jun. 2, 2009 Written Opinion issued in Application No. PCT/GB2009/000179.
Apr. 24, 2008 British Search Report issued in Application No. GB0801492.0.
Jul. 28, 2009 International Search Report issued in Application No. PCT/GB2009/000186.
Jul. 28, 2009 Written Opinion issued in Application No. PCT/GB2009/000186.
May 21, 2008 British Search Report issued in Application No. GB0801395.5.
Jul. 14, 2009 International Search Report issued in Application No. PCT/GB2009/001223.
Jul. 14, 2009 Written Opinion issued in Application No. PCT/GB2009/001223.
Jul. 14, 2009 International Search Report issued in Application No. PCT/GB2009/001226.
Jul. 14, 2009 Written Opinion issued in Application No. PCT/GB2009/001226.
Jul. 6, 2009 Written Opinion issued in Application No. PCT/GB2009/001222.
May 21, 2008 British Search Report issued in Application No. GB0801406.0.
Aug. 31, 2008 British Search Report issued in Application No. GB0801406.0.
Sep. 2, 2008 British Search Report issued in Application No. GB0801406.0.
U.S. Appl. No. 12/863,509, filed Jul. 19, 2010.
U.S. Appl. No. 12/993,098, filed Nov. 17, 2010.
Rass, S., "A Method of Authentication for Quantum Networks," Proceedings of World Academy of Science, Engineering and Technology, vol. 12, (2006).
Nov. 8, 2012 Office Action issued in U.S. Appl. No. 12/863,510.
Nov. 9, 2012 Office Action issued in U.S. Appl. No. 13/130,790.
Office Action dated May 11, 2012 issued in U.S. Appl. No. 12/812,849.
Stucki et al., "Quantum Key Distribution Over 67km With Plug &Play System," New Journal of Physics 4, pp. 41.1-41.8, 2002.
Benabid, "Hollow-core Photonic Bandgap Fibre: New Light Guidance for New Science and Technology," Philosophical Transactions of the Royal Society, 2006, pp. 3439-3462, vol. 364, Bath, U.K.
Bennett et al. "Quantum Cryptography: Public Key Distribution and Coin Tossing," International Conference on Computers, Systems & Signal Processing, Dec. 10-12, 1984, Bangalore, India.
Bennett, "Quantum Cryptography Using Any 2 Non-orthogonal States," Physical Review Letters, May 25, 1992, pp. 3121-3124, vol. 68, No. 21.
Bennett et al., "Generalized Privacy Amplification," IEEE Transactions on Information Theory, 1995, pp. 1915-1923, vol. 41, No. 6.
Gilbert et al., "Secrecy, Computation Loads and Rates in Practical Quantum Cryptography," Algorithmica, 2002, pp. 314-339, vol. 34, US.
Kanamori et al., "3 Party Quantum Authenticated Key Distribution with Partially Trusted Third Party," IEEE Communications Society, 2008, Globecom 2008 Proceedings.
Lütkenhaus, "Estimates for Practical Quantum Cryptography," Helsinki Institute of Physics, Feb. 1, 2008, pp. 1-26, Helsinki, Finland.
Aug. 13, 2008 Search Report issued in International Application No. GB0809038.3.
Aug. 13, 2008 Search Report issued in International Application No. GB0809044.1.
Aug. 14, 2008 Search Report issued in International Application No. GB0809045.8.
Jan. 23, 2009 Search Report issued in International Application No. GB0819665.1.
Mar. 18, 2009 Search Report issued in International Application No. GB0822356.2.
Mar. 16, 2009 Search Report issued in International Application No. GB0822254.9.
Mar. 16, 2009 Search Report issued in International Application No. GB0822253.1.
Jan. 25, 2010 Search Report issued in International Application No. GB0917060.6.
Jun. 29, 2010 Search Report issued in International Application No. GB0917060.6.
Mar. 25, 2010 Search Report and Written Opinion issued in International Application No. PCT/GB2009/002543.
Jan. 4, 2010 Search Report and Written Opinion issued in International Application No. PCT/GB2009/002745.
Sep. 30, 2010 Search Report and Written Opinion issued in International Application No. PCT/GB2009/002802.
Apr. 20, 2010 Search Report and Written Opinion issued in International Application No. PCT/GB2009/002801.
May 31, 2012 Search Report and Written Opinion issued in International Application No. PCT/GB2011/001670.
Aug. 1, 2012 Office Action issued in U.S. Appl. No. 12/993,098.
Aug. 15, 2012 Office Action issued in U.S. Appl. No. 12/863,483.
Sep. 12, 2012 Office Action issued in U.S. Appl. No. 12/863,509.
Jun. 21, 2012 Office Action issued in U.S. Appl. No. 12/863,510.
Sep. 21, 2012 Office Action issued in U.S. Appl. No. 12/812,849.
Oct. 4, 2012 Office Action issued in U.S. Appl. No. 12/992,695.
U.S. Appl. No. 13/130,944 in the name of Benton, filed May 24, 2011.
U.S. Appl. No. 13/130,897 in the name of Wiseman, filed May 24, 2011.
U.S. Appl. No. 13/130,790 in the name of Wiseman, filed May 24, 2011.
U.S. Appl. No. 13/125,735 in the name of Wiseman, filed Apr. 22, 2011.
U.S. Appl. No. 12/863,483 in the name of Wiseman, filed Jul. 19, 2010.
U.S. Appl. No. 12/993,146 in the name of Hicks, filed Nov. 17, 2010.
U.S. Appl. No. 12/992,695 in the name of Wiseman, filed Nov. 24, 2010.
Sep. 17, 2012 Office Action issued in U.S. Appl. No. 12/310,922.
Oct. 29, 2012 Office Action issued in U.S. Appl. No. 12/993,146.
Mar. 25, 2013 Office Action issued in U.S. Appl. No. 12/310,922.
Nov. 16, 2012 Office Action issued in U.S. Appl. No. 13/130,897.
Jan. 3, 2013 Office Action issued in U.S. Appl. No. 13/125,735.
Jan. 18, 2013 Office Action issued in U.S. Appl. No. 12/993,098.
Feb. 11, 2013 Notice of Allowance issued in U.S. Appl. No. 12/863,483.
Mar. 13, 2013 Office Action issued in U.S. Appl. No. 12/992,695.
Apr. 11, 2013 Office Action issued in U.S. Appl. No. 13/130,944.
May 10, 2013 Office Action issued in U.S. Appl. No. 13/130,897.
Ibrahim et al., "Simulation of Static Optical XPM in Active MMI Couplers," (published in International Conference on Numerical Simulation of Optoelectronic Devices, Sep. 2007), pp. 95-96.
Jul. 3, 2013 Office Action issued in U.S. Appl. No. 12/993,098.
Jun. 28, 2013 Office Action issued in U.S. Appl. No. 13/130,790.
Jun. 19, 2013 Notice of Allowance issued in U.S. Appl. No. 12/993,146.
Jun. 11, 2013 Office Action issued in U.S. Appl. No. 12/863,509.
Apr. 30, 2013 Translation of Office Action cited in Japanese Patent Application No. 2010-543567.
US 5,150,251, 09/1992, Tomita et al. (withdrawn).
Sep. 12, 2013 Office Action issued in U.S. Appl. No. 13/130,897.
Sep. 18, 2013 Office Action issued in U.S. Appl. No. 12/812,849.
Lijun MA, "Experimental Demonstration of an Active Quantum Key Distribution Network with Over Gbps Clock Synchronization," IEEE Communications Letters, vol. 11, No. 12, Dec. 2007, pp. 1019-1021.
Brassard, et al., "Multi-User Quantum Key Distribution Using Wavelength Division Multiplexing," 2003, pp. 1-5.
Aug. 29, 2013 Office Action issued in U.S. Appl. No. 12/992,695.
Nov. 5, 2013 Office Action issued in U.S. Appl. No. 12/863,510.
Nov. 7, 2013 Office Action issued in U.S. Appl. No. 12/993,098.

\* cited by examiner

|  | BIT VALUE | |
|---|---|---|
|  | 0 | 1 |
| BASIS + | ↑ | → |
| BASIS x | ↗ | ↘ |

Figure 3

| Alice's Bit (random) | 0 | 1 | 1 | 0 | 1 | 0 | 0 | 1 |
|---|---|---|---|---|---|---|---|---|
| Alice's Basis (random) | + | + | x | + | x | x | x | + |
| Polarization sent by Alice | ↑ | → | ↘ | ↑ | ↘ | ↗ | ↗ | → |
| Bob's Measuring Basis (random) | + | x | x | x | + | x | + | + |
| Polarization measured by Bob | ↑ | ↗ | ↘ | ↗ | → | ↗ | → | → |
| Same Basis used? | YES | NO | YES | NO | NO | YES | NO | YES |
| Bits for use in shared Secret Key | 0 |  | 1 |  |  | 0 |  | 1 |

Figure 4

METHODS AND APPARATUS FOR USE IN QUANTUM KEY DISTRIBUTION

FIELD OF INVENTION

This invention relates to methods and apparatus for use in Quantum Key Distribution (QKD), Aspects of the invention relate to methods and apparatus which support the use of QKD in fibre optic networks.

BACKGROUND TO INVENTION

QKD is a cryptographic process which uses the principles of quantum mechanics to allow secure communication between two parties. This is in contrast to conventional classical public key cryptography, which relies on the computational difficulty of solving certain mathematical problems. In a typical QKD process, a random bit string is established as being shared between two parties. Individual bits of the bit string are transmitted using single photons. By using complementary properties to which Heisenberg's uncertainty principle applies, information may be encoded into a photon in such a way that any attempt by a third party to monitor the photon will disturb its state. Once a secret key is established between the two parties by QKD methods, this may then be used to encrypt data transmitted over any conventional path.

Photon polarization may be used to provide the necessary complementary property for encoding purposes. This is the approach used in the most widely used QKD protocol, BB84 (originally described in C. H. Bennet and G. Brassard, "Quantum Cryptography: Public key distribution and coin tossing", in Proceedings of the IEEE International Conference on Computers, Systems, and Signal Processing, Bangalore, p. 175 (1984)). BB84 may be applied to alternative approaches using conjugate states such as phase encoding. Different protocols (such as E91) based on entanglement of photon pairs may also be used in QKD.

In BB84, a sender (generally referred to as "Alice") and a receiver (generally referred to as "Bob") are connected by an optical path—this may for example be by free space or optical fibre. Quantum states may be transmitted over this path. Alice and Bob are also connected by a conventional classical channel of any type which allows communication between the two. Neither channel needs to be secure against eavesdropping, as the protocol prevents effective interference by an eavesdropper (generally referred to as "Eve").

Each bit of information ("0" or "1") is encoded onto an individual photon by selecting from a pair of orthogonal polarisation states. BB84 uses two pairs of states and each pair of orthogonal states is referred to as a "basis". However, the two bases are not orthogonal to each other—this property is used to make the protocol secure. Quantum indeterminacy, according to Heisenberg's Uncertainty principle, means that such states cannot in general be measured definitely without disturbing the original state. Further, the "no cloning theorem", a theorem of quantum mechanics, shows that the creation of identical copies of the non-orthogonal state is forbidden. The following three bases may all be used to provide polarization state pairs: the rectilinear basis of vertical)(0° and horizontal)(90°; the diagonal basis of 45° and 135°; and the circular basis of left-handedness and right-handedness. Any two of these bases are conjugate to each other, and so any two of these bases may be used in the protocol.

In execution of the protocol, Alice creates a random bit and selects a random basis and transmits a single photon in a polarization state defined by this bit and basis and records the time the photon was sent—this process is repeated for a string of bits. Bob selects at random a basis for measuring each bit and records time of receipt, measurement basis and measurement result for each bit received. Bob communicates the basis in which each photon was received and Alice communicates the basis in which each photon was sent—bits in which a different basis was used are discarded, leaving the remaining bits as the basis for a shared key. A subset of the shared bits is used by Alice and Bob to check against eavesdropping, which will have introduced errors. Information reconciliation and privacy amplification techniques may then be used to determine a shared key.

The implementation of QKD over different kinds of fibre optic network has been discussed, and various QKD systems have been put into practical operation, generally using a dedicated quantum channel and a wholly separate classical channel. It has been appreciated that in order to achieve commercially successful QKD technology, it is desirable to reuse existing infrastructure where possible. The SEGUR@ project, a part of the CENIT program funded by the Spanish Ministry of Industry, Tourism and Trade, is directed to the delivery of QKD using pre-existing passive optical networks. A passive optical network (PON) is an optical network without amplification, in which the quantum signal is therefore not amplified. It is however still unclear how a cost-effective QKD solution may be provided over such an infrastructure.

There is therefore a need for QKD methods and architecture that can be provided cost-effectively for use with existing or conventional fibre optic networks.

SUMMARY OF INVENTION

In a first aspect, the invention provides a fibre optic networking component comprising: at least one input for receiving an input signal from an input optical fibre; at least one output for providing an output signal to an output optical fibre; a first add drop multiplexer for splitting the input signal into an input quantum signal and an input classical signal, and a second add drop multiplexer for combining an output quantum signal with an output classical signal into an output signal; the fibre optic networking component having a first processing path for processing the input quantum signal into the output quantum signal and a second processing path for processing the input classical signal into the output classical signal, wherein the second processing path comprises processing logic to process the input classical signal and to produce the output classical signal.

The present inventors have appreciated that by routing a quantum signal and a classical signal for quantum key distribution over the same fibre, but by processing these signals separately at a network node, quantum key distribution can be carried out effectively over conventional fibre optic networks without prohibitive cost (through the requirement for discrete fibre paths or discrete components for each possible QKD channel).

The fibre optic networking component may further comprise a matrix of optical switches, wherein the fibre optic networking component comprises a plurality of outputs and wherein the matrix of optical switches is connected to the second processing path whereby the matrix of optical switches may be controlled by the second processing path in response to the input classical signal. This allows the classical signals to be used to control the routing of the quantum key distribution signals.

Advantageously, the quantum signals and the classical signals are carried at separate wavelengths. In this case, add drop multiplexer may comprise one or more filters adapted to reflect the classical signals and transmit the quantum signals.

This allows for wavelength division multiplexing of quantum signals over a fibre optic network. Component choice may be made so as to minimise the possibility of losses on the quantum signal path.

Advantageously, the second processing path may comprise conversion of the input classical signal to a first electrical signal at a first transponder, processing of the first electrical signal and generation of a second electrical signal by a fibre optic networking component logic unit, and conversion of the second electrical signal to the output classical signal at a second transponder. This allows information provided in the classical signal to be processed and used at each node, making this an appropriate channel for network management messages and routing information.

In appropriate arrangements, the fibre optic networking component may be bidirectional for classical signals, whereby the fibre optic networking component is adapted to receive a second input classical signal at one of the at least one outputs, to convert the second input classical signal to a third electrical signal at the second transponder, to process the third electrical signal and generate a fourth electrical signal at the fibre optic networking component logic unit, and to convert the fourth electrical signal to a second output classical signal at the first transponder, and to transmit the second output classical signal at one of the at least one inputs. This allows for efficient routing of messages and improves component use.

The first processing path may comprise direct transmission of the input quantum signal one of the at least one outputs. This is appropriate if the quantum signal will not acquire unacceptable levels of error before the next possible network node.

Alternatively, the first processing path may comprises a quantum receiver and a quantum transmitter, and wherein the first processing path and the second processing path together provide key agreement logic, whereby the fibre optic networking component is adapted to agree a first key by quantum key distribution with a source of the input quantum signal and to agree a second key by quantum key distribution with a destination of the output quantum signal. This arrangement, using mechanisms described in more detail below, allow for extension of the possible range between quantum transmitter and receiver by use of an intermediate quantum node. In this arrangement, the second key may be partly or wholly determined by the source of the input quantum signal.

In particular networks, it may be appropriate for data traffic, as well as QKD traffic, to be handled within the fibre optic networking component. In this case, the first add drop multiplexer may be adapted for splitting the input signal into an input data signal as well as an input quantum signal and an input classical signal, and the second add drop multiplexer adapted for combining an output data signal as well as an output quantum signal and an output classical signal. In such an arrangement, the data signals, the quantum signals and the classical signals are all advantageously carried at separate wavelengths, and the input signal and the output signal are wavelength division multiplexed signals. This is particularly suitable for signal transmission over passive optical networks.

In a second aspect, the invention provides a method of distributing a key from a key generation node to a destination node by quantum key distribution, comprising the following steps at the key generation node: generating a quantum signal at a first wavelength in accordance with a quantum key distribution protocol; generating a classical signal at a second wavelength or set of wavelengths, wherein the classical signal contains a classical signal in accordance with the quantum key distribution protocol and messaging information for a network for routing the quantum signal and the classical signal to the destination node; combining the quantum signal and the classical signal on to an optical fibre for transmission to the destination node; and receiving an input classical signal from the destination node to establish the key.

In a third aspect, the invention provides a method of distributing a key from a key generation node to a destination node by quantum key distribution, comprising the following steps at the destination node: receiving an input signal; separating the input signal into a quantum signal at a first wavelength and a classical signal at a second wavelength or set of wavelengths; measuring the quantum signal in an arbitrary basis to provide a bit stream; and generating a return classical signal to establish the key from the bit stream in accordance with a quantum key distribution protocol, wherein the return classical signal comprises messaging information for a network to route the return classical signal to the key generation node.

In a fourth aspect, the invention provides a method of distributing a key from a key generation node to a destination node by quantum key distribution, comprising the following steps at an intermediate node between the key generation node and the destination node: receiving an input signal from the key generation node; separating the input signal into a quantum signal at a first wavelength and a classical signal at a second wavelength or set of wavelengths; processing the classical signal to obtain first messaging information relating to a network connecting the key generation node and the destination node, processing the first messaging information, and generating a modified classical signal; and combining the quantum signal and the modified classical signal for transmission to the destination node.

Advantageously, in this arrangement, processing the first messaging information comprises configuring the intermediate node for routing the quantum signal and the modified classical signal to the destination node.

These methods allow for effective distribution of keys over fibre optic networks, including conventional fibre optic networks, with efficient use of quantum componentry and optical fibre.

In a fifth aspect, the invention provides a fibre optic component comprising a set of optical switches, an optical switch controller, and one or more quantum key distribution modules, wherein each quantum key distribution module is provided with a first port and a second port each connected to the set of optical switches and is further provided with an electrical connection to the optical switch controller, wherein the optical switch controller is adapted to control the set of optical switches to route quantum key distribution signals in response to signals received from the one or more modules by means of the electrical connection.

This modular approach to the provision of a fibre optic component provided with quantum key distribution functionality allows for practical and cost effective implementation—and modification—of a quantum key distribution infrastructure.

The fibre optic component module may be arranged such that the set of optical switches can route the quantum key distribution signal to any one of two or more destination nodes. This provides a more versatile network when compared to networks which are able simply to route traffic around a node, link or the like.

In a sixth aspect, the invention provides a quantum key distribution module for use in a fibre optic component as described above, the quantum key distribution module consisting of a quantum signal transmission module in which a signal received in the first port is separated into a quantum signal and a classical signal, wherein the classical signal is processed to provide routing information to the optical switch controller and a modified classical signal is generated, and wherein the quantum signal and the modified classical signal are combined for transmission through the second port.

In a seventh aspect, the invention provides a quantum key distribution module for use in a fibre optic component as described above, the quantum key distribution module consisting of a quantum signal regeneration module in which a signal received in the first port is separated into a quantum signal and a classical signal, wherein the quantum signal and the classical signal are processed to agree a first key with a source of the received signal and a new quantum signal is generated for transmission to a destination node, wherein the classical signal is processed to provide routing information to the optical switch controller and a modified classical signal associated with the new quantum signal is generated, and wherein the further quantum signal and the modified classical signal are combined for transmission through the second port.

In an eighth aspect, the invention provides a quantum key distribution module for use in a fibre optic component as described above, the quantum key distribution module consisting of a classical module in which a signal at the first port is treated as a classical signal and processed to provide routing information to the optical switch controller and a modified classical signal is generated, and wherein the modified classical signal is provided for transmission through the second port.

These modules allow for modular construction, and reconfiguration, of nodes in a fibre optic quantum key distribution network.

Advantageously, each such quantum key distribution channel type is adapted to be bidirectional in respect of classical signals, whereby a return classical signal received at the second port is processed to provide routing information to the optical switch controller and a modified return classical signal is generated, and wherein the modified return classical signal is provided for transmission through the first port.

In a ninth aspect, the invention provides a key management centre for distribution of keys to a plurality of destination nodes by quantum key distribution, the key management centre comprising: at least one quantum transmitter unit adapted to produce quantum key distribution quantum signals and quantum key distribution classical signals according to a quantum key distribution protocol to agree keys with one or more destination nodes; a key management system to manage the provision of keys to destination nodes; and a network management system to manage messaging over a quantum key distribution network comprising the key management centre and the destination nodes; the key management centre further comprising a classical signal processing unit to create classical signals comprising quantum key distribution classical signal information, key management system messages, and network management system messages.

Such an arrangement allows for effective quantum key distribution by allowing central management of messaging over a key distribution network associated with the source of the original keys. This is achieved in such a way that the network components can be used effectively, with redundancy where necessary to achieve effective system operation but with reuse of components and communication paths where appropriate to save cost.

In a tenth aspect, the invention provides a method of distributing keys over a passive optical network by quantum key distribution, the method comprising: generating, at at least one quantum transmitter unit, quantum key distribution quantum signals and quantum key distribution classical signals according to a quantum key distribution protocol to agree keys with one or more destination nodes; combining the quantum key distribution classical signal information with routing information to determine routing of the quantum key distribution signals to one of the one or more distribution nodes in a modified quantum key distribution classical signal; combining quantum key distribution quantum signals, modified quantum key distribution classical signals and encrypted data signals on to an output optical channel; and splitting the output optical channel on to a plurality of output optical fibres for transmission on to the passive optical network.

By this approach, quantum key distribution can be made effective over a passive optical network without the great increase in component cost that would be required by having quantum components at every node. Further, it is possible to select from at least one output fibre over which route signals are sent. Each output fibre may connect to a separate PON. This is advantageous in that one or a few Quantum Key Distribution are required to service each multiple of PONs.

In an eleventh aspect, the invention provides a quantum transmitter unit for use in quantum key distribution, the quantum transmitter unit comprising: a laser adapted to provide pulsed or continuous wave output; a first optical path comprising an attenuator for providing single photon output and a second optical path for providing continuous wave output, and switching means to switch the quantum transmitter unit between the first optical path and the second optical path; a polarisation modulator for providing a polarised output; whereby the transmitter unit is adapted for switching between: a single photon generation state in which the laser is adapted to provide pulsed output, light from the laser is transmitted along the first optical path, and single photons in a state determined by the polarisation modulator are generated according to a quantum key distribution protocol; and a calibration state in which the laser is adapted to provide continuous wave output, light from the laser is transmitted along the second optical path, and light beams in a state determined by the polarisation modulator are generated in order to allow compensation for polarisation changes between the transmitter unit and a destination for the single photon signals.

In a twelfth aspect, the invention provides a quantum receiver unit for use in quantum key distribution, the quantum receiver unit comprising: means to detect a received single photon signal as a bit in an arbitrary basis state, the means comprising a detector for each bit value in each basis state, wherein each said detector is adapted to be switched between a single photon detection state and a calibration state, whereby in the calibration state the detector is adapted for detection of a bright pulse to determine a size of polarisation errors in a transmission system between a source of quantum key distribution signals and the quantum receiver unit.

These approaches enable the cost of producing quantum transmitter units and quantum receiver units to be controlled by component reuse, and enable error to be reduced by ensuring that the same components and, where possible, optical paths are used for calibration and measurement.

Specific embodiments of the invention will now be described below, by way of example, with reference to the following figures, of which:

Figure 1:
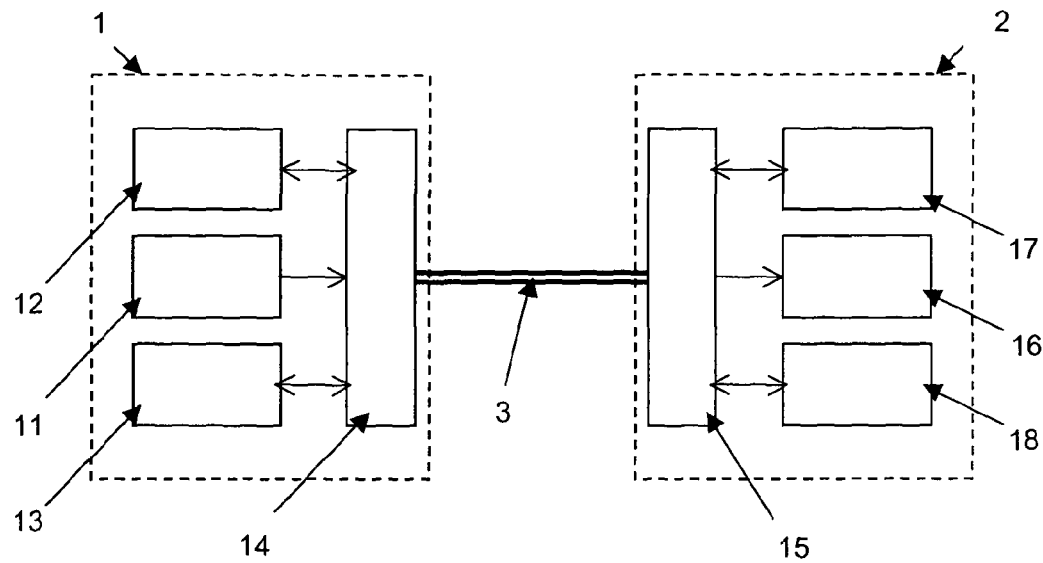
FIG. 1 shows the basic elements of an implementation of quantum key distribution system using a direct connection between two nodes according to an embodiment of aspects of the invention.
Figure 5A:
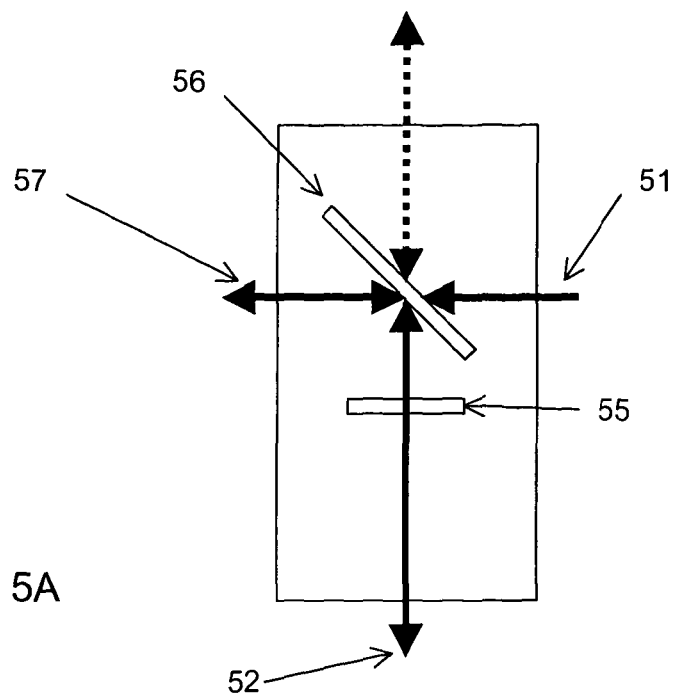
Figure 5B:
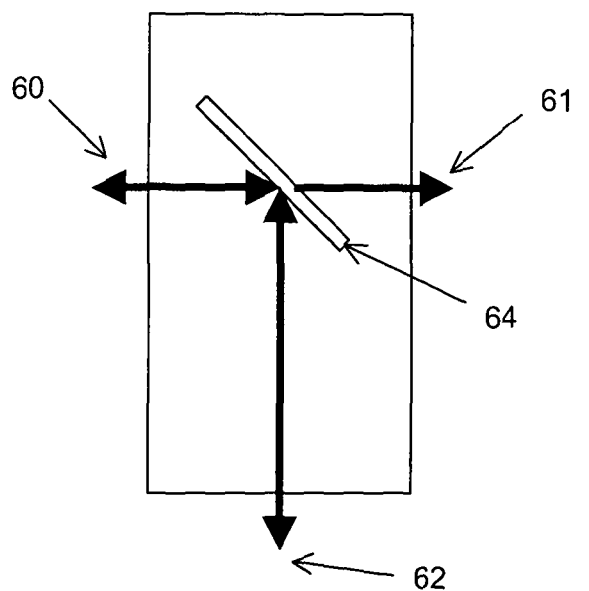
Figure 6A:
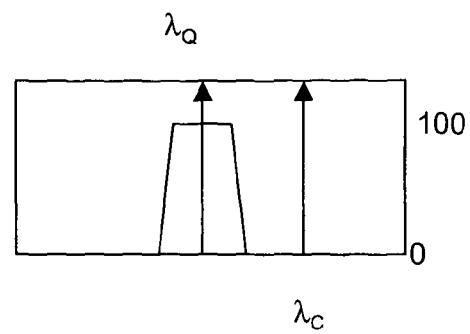
Figure 6B:
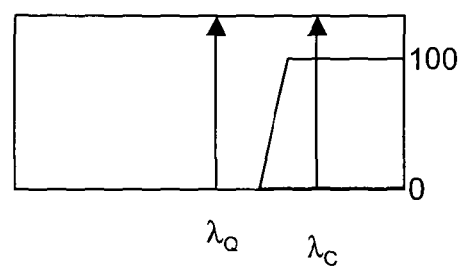
Figure 6C:
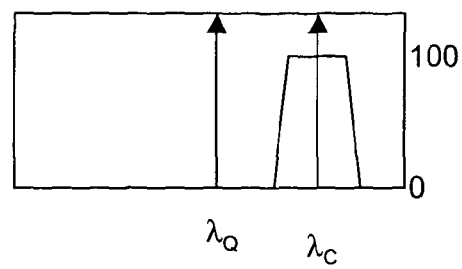
Figure 7:
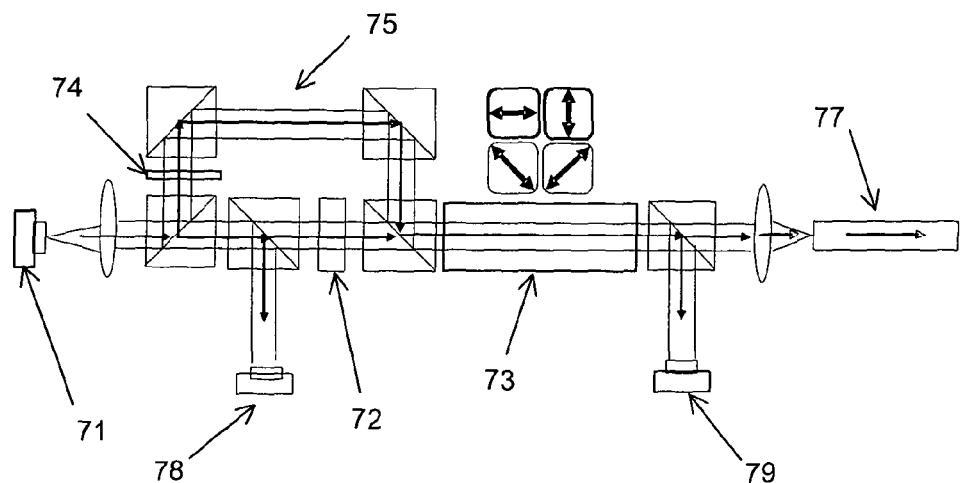
Figure 8:
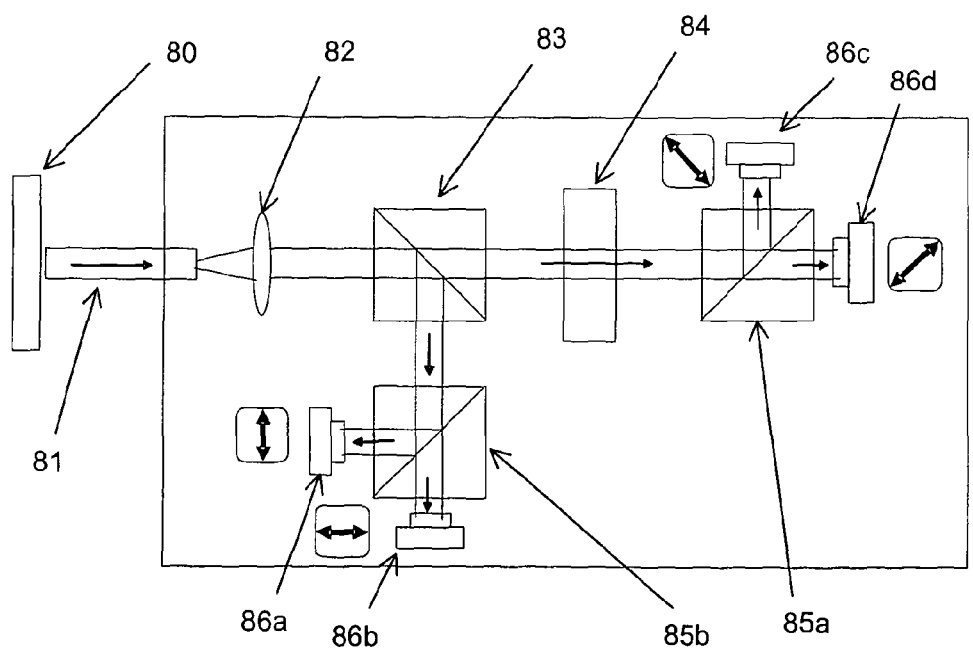
Figure 9A:
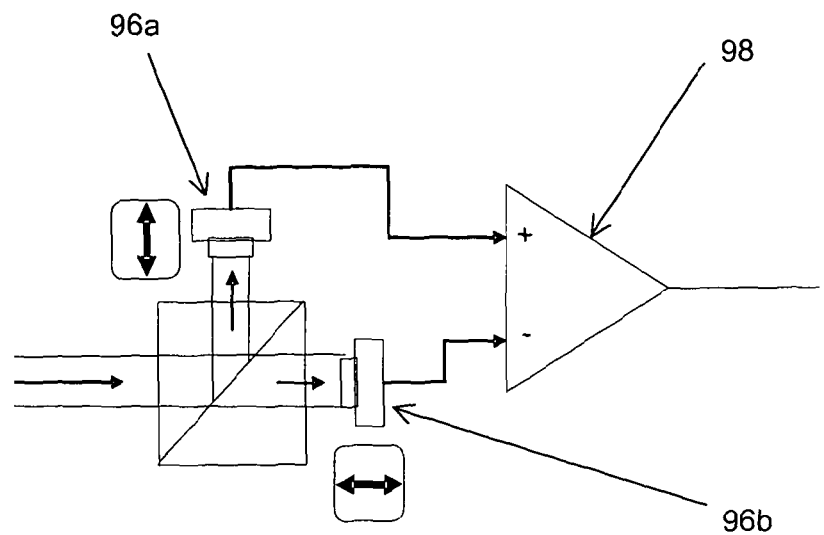
Figure 9B:
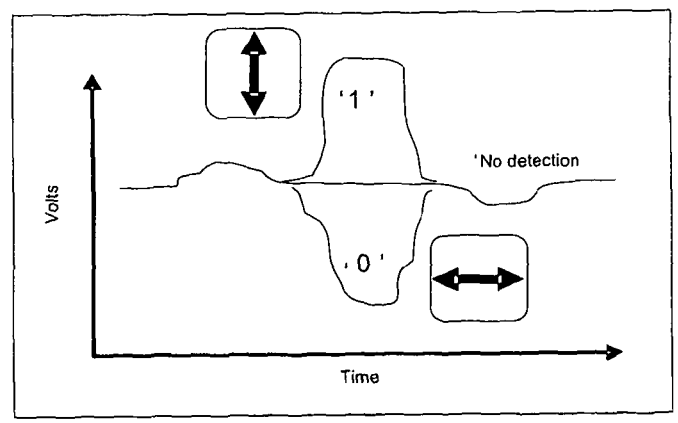
Figure 10:
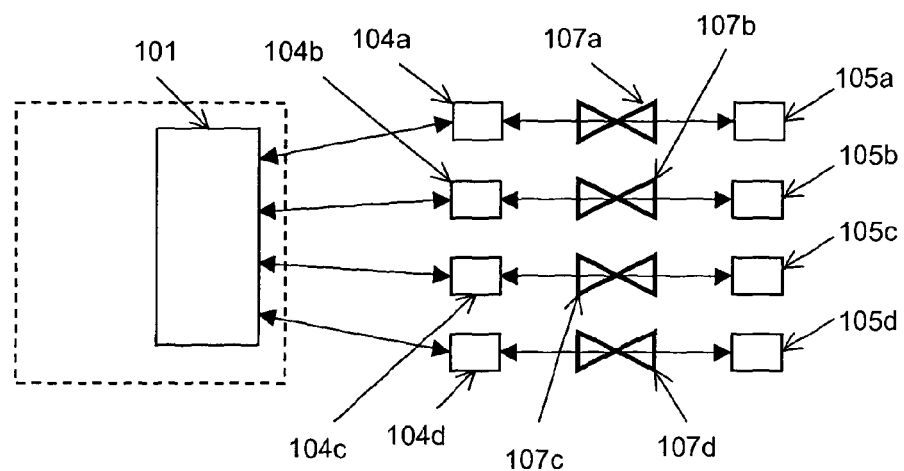
Figure 11A:
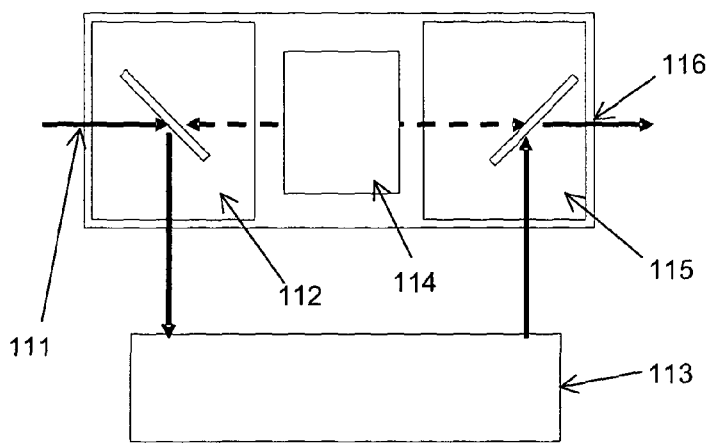
Figure 11B:
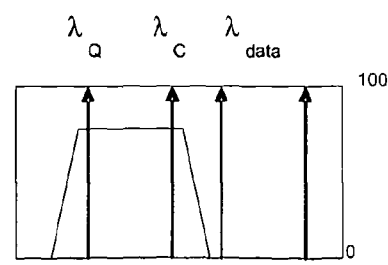
Figure 12:
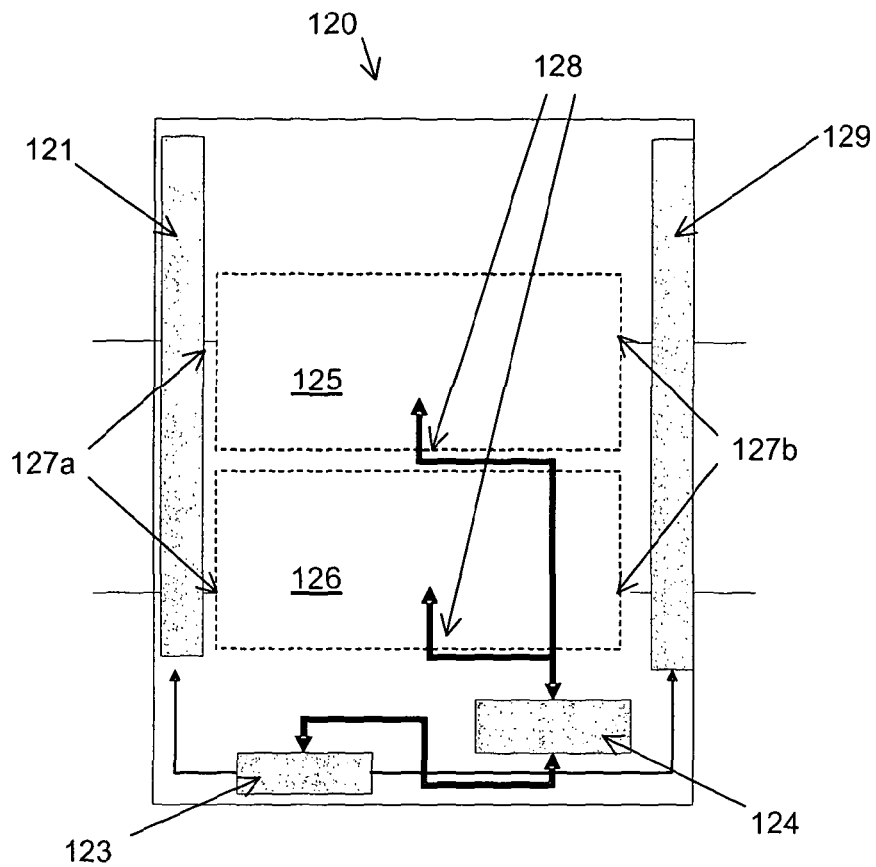
Figure 13:
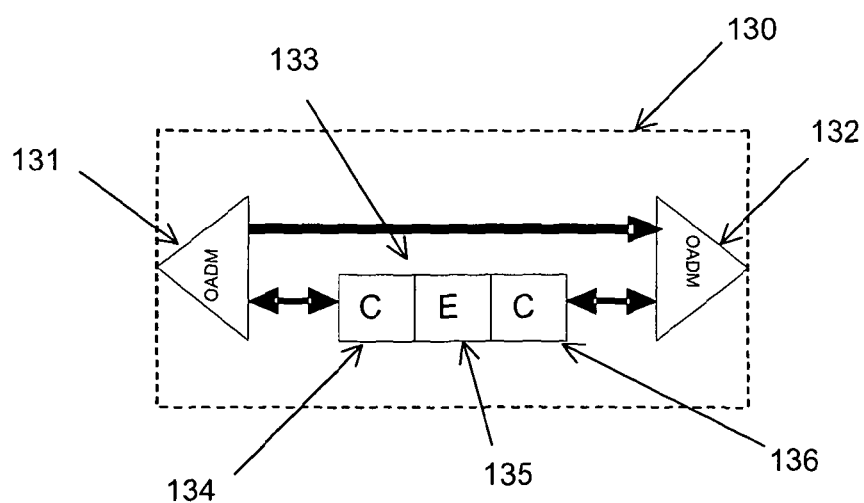
Figure 14:
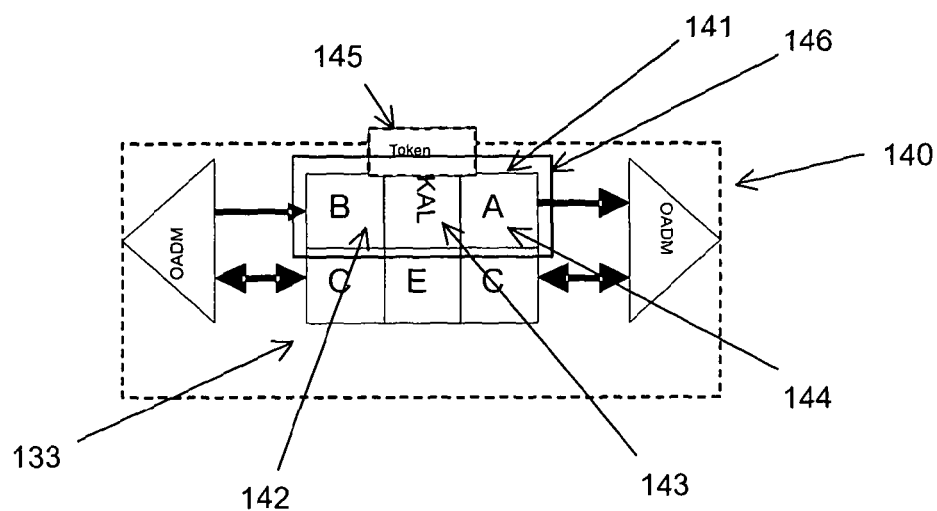
Figure 15:
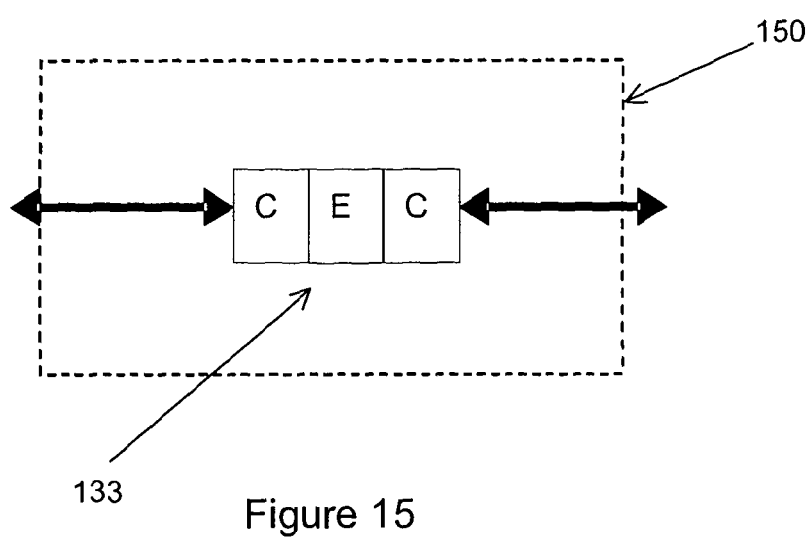
Figure 16:
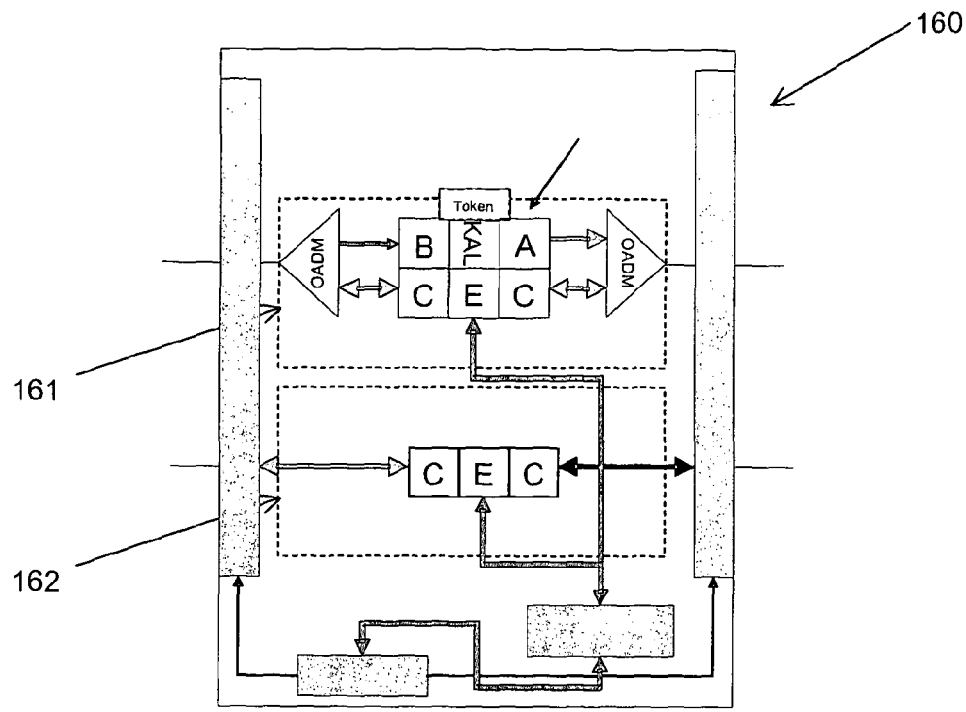
Figure 17:
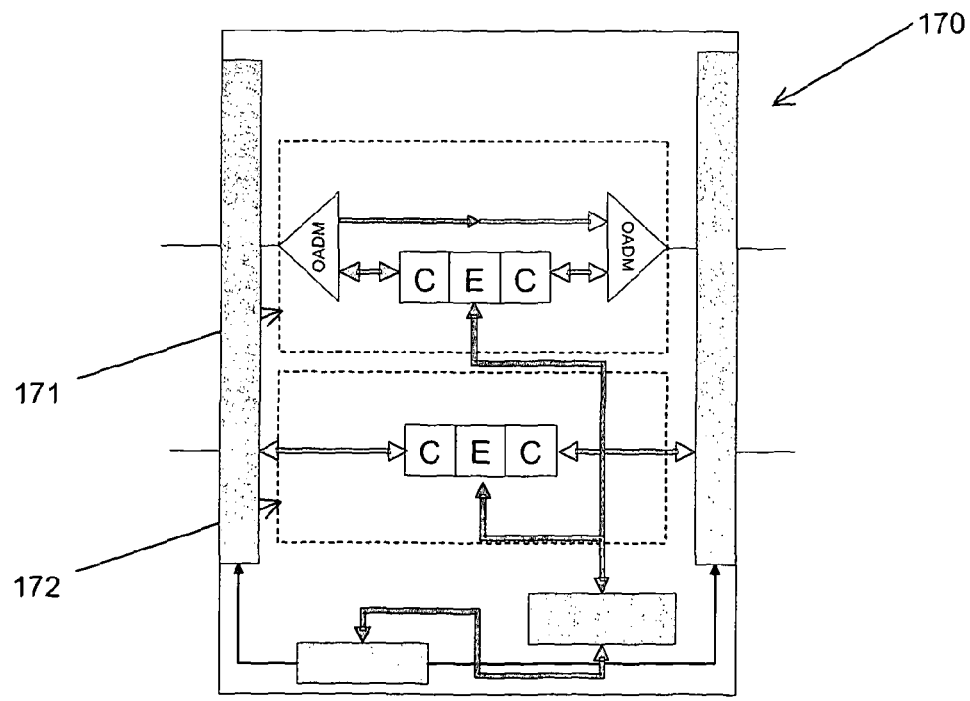
Figure 18:
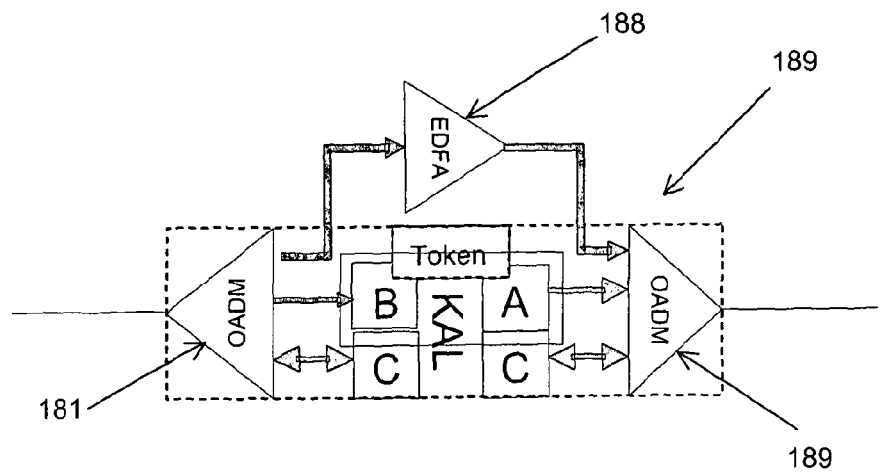
Figure 19:
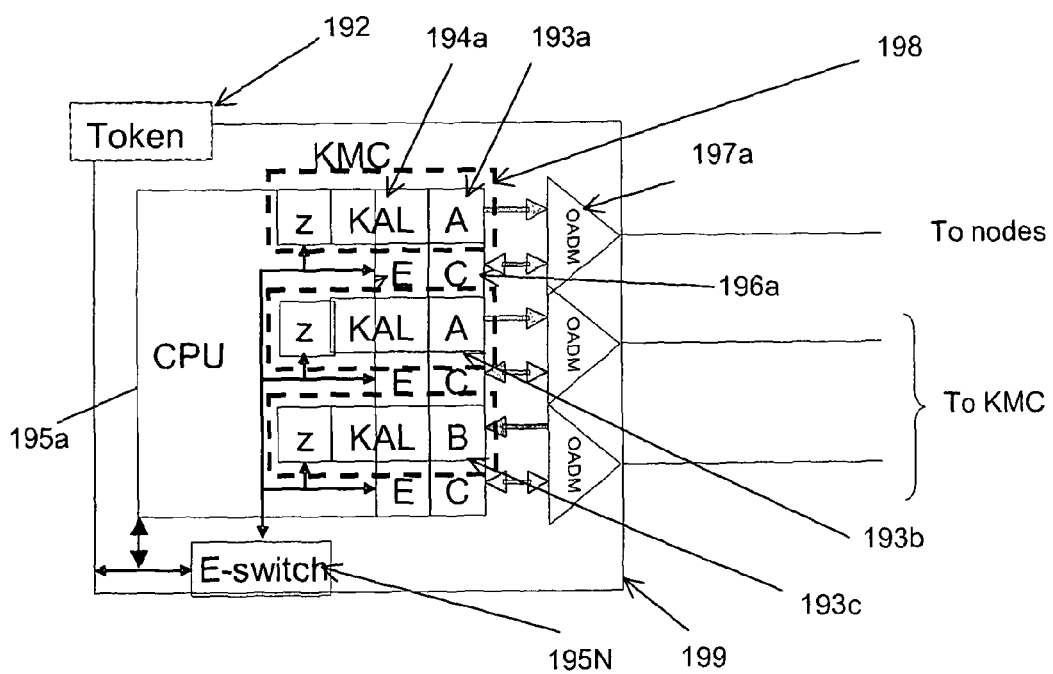
Figure 20:
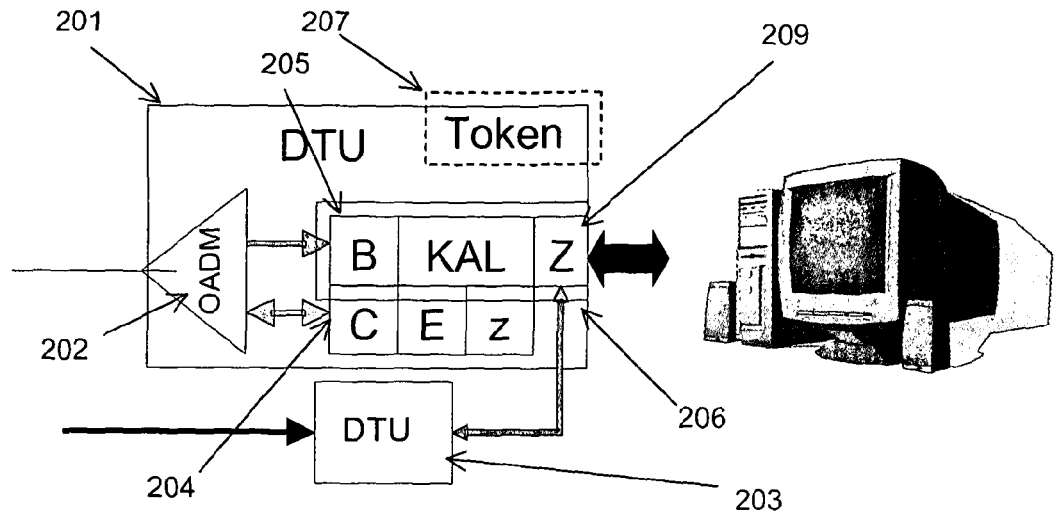
Figure 21:
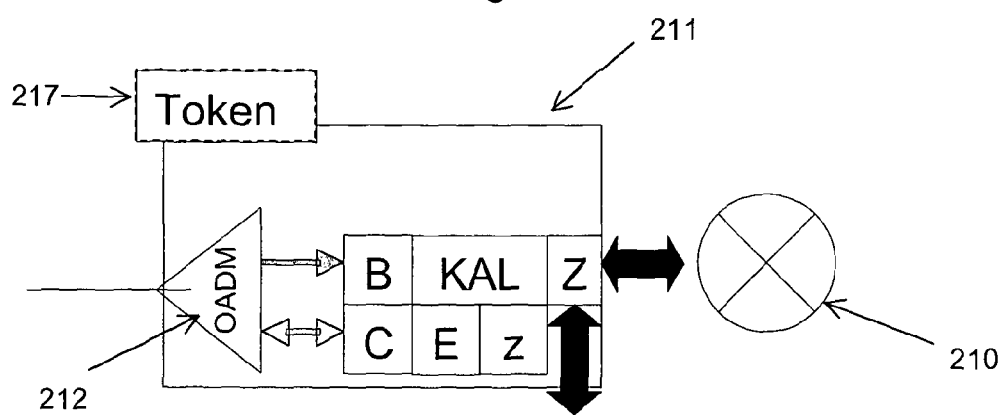
Figure 22:
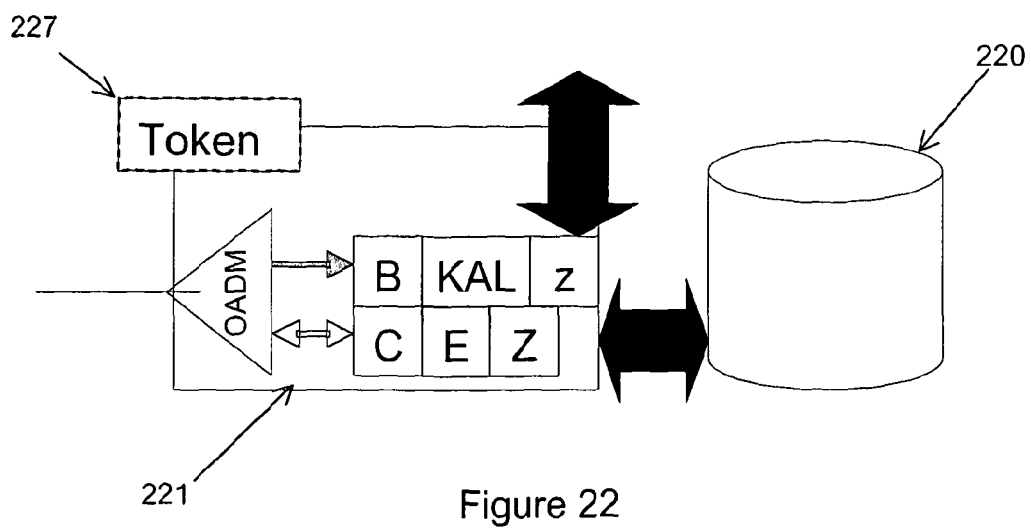
Figure 23:
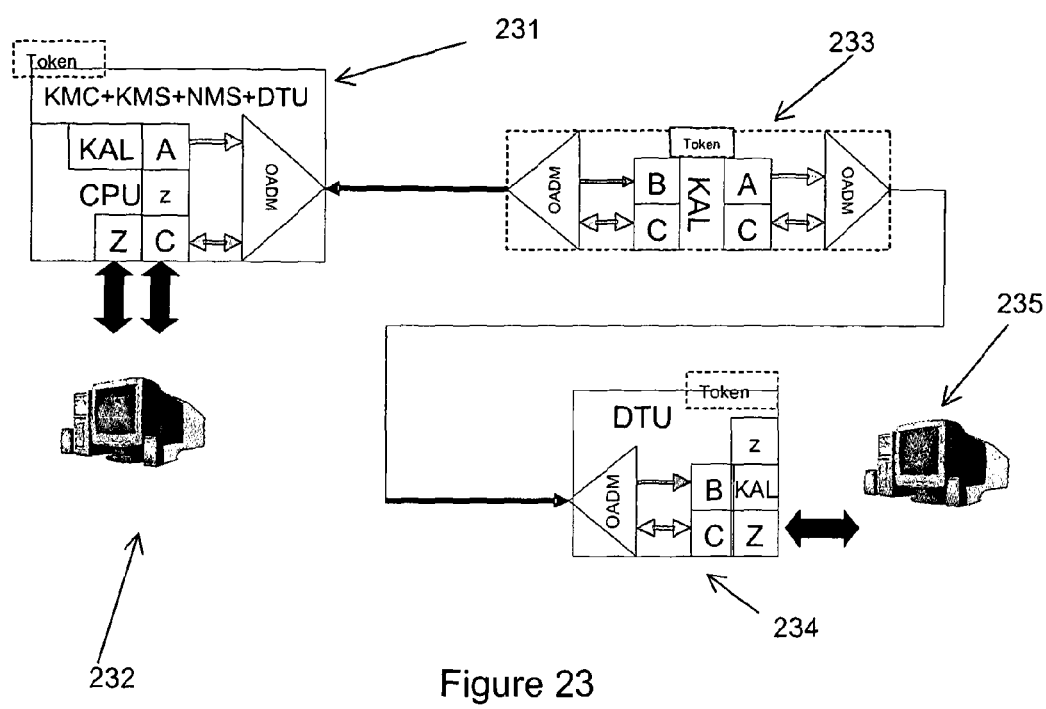
Figure 24:
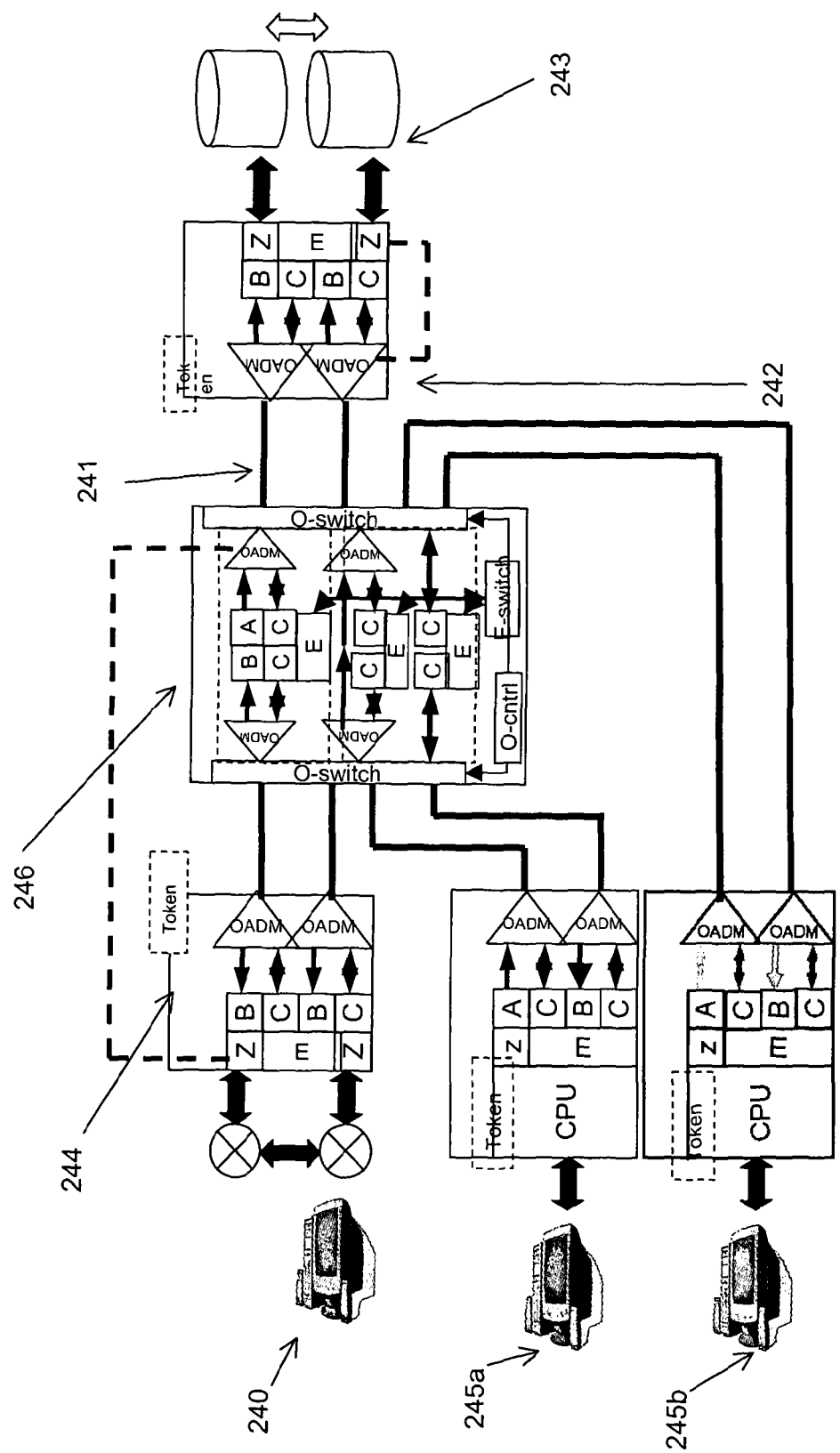
Figure 25:
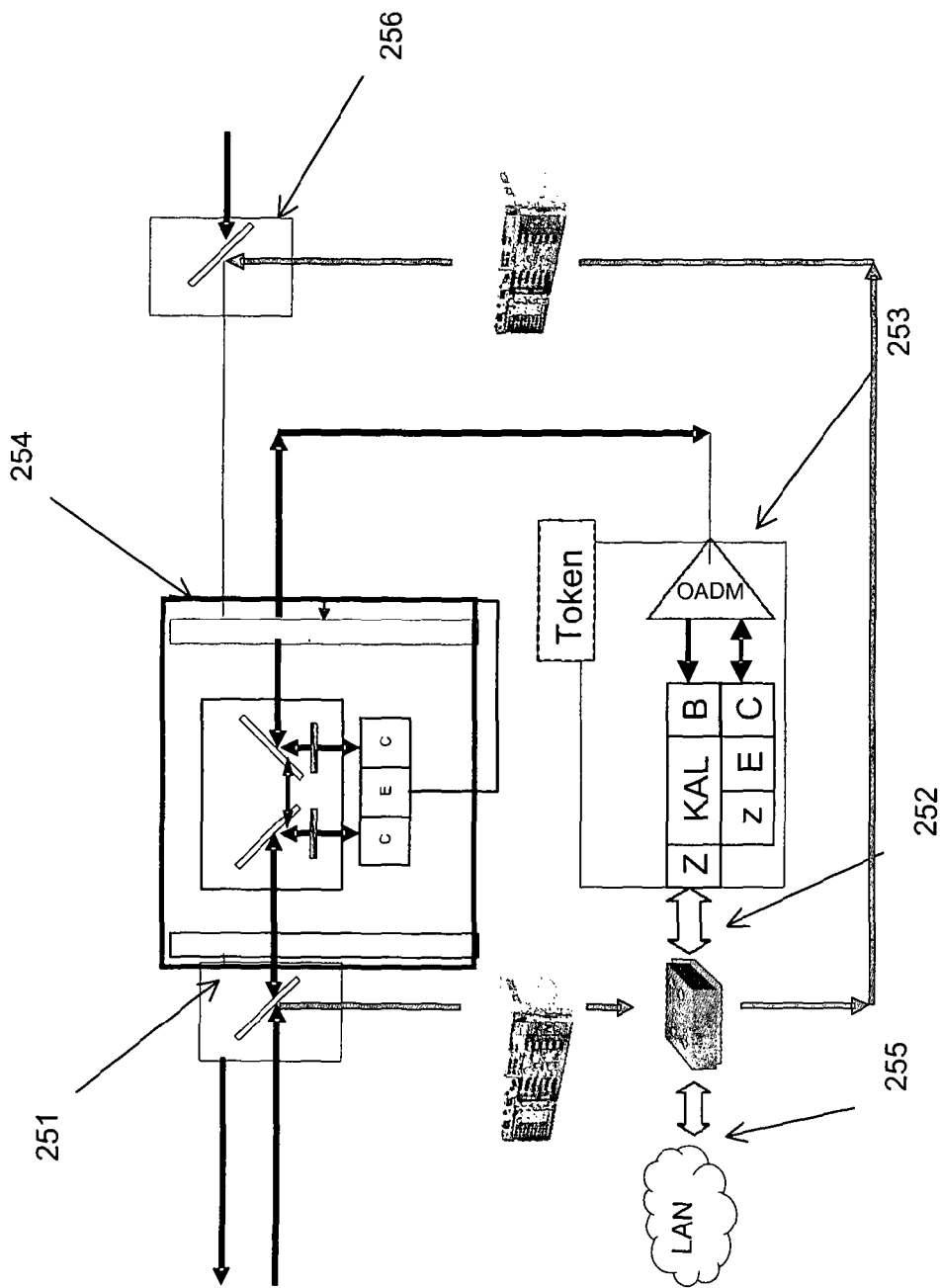
Figure 26:
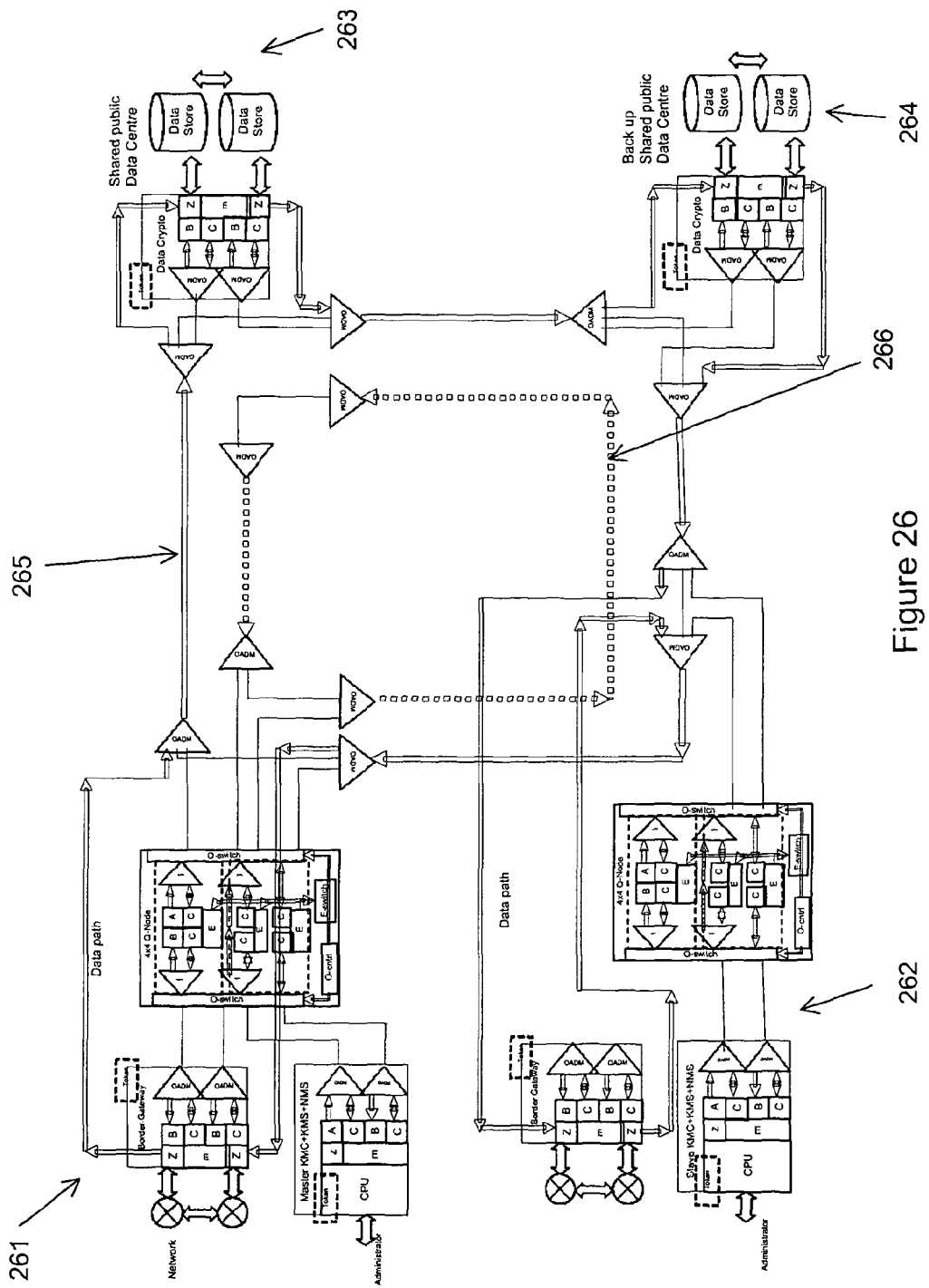
Figure 27:
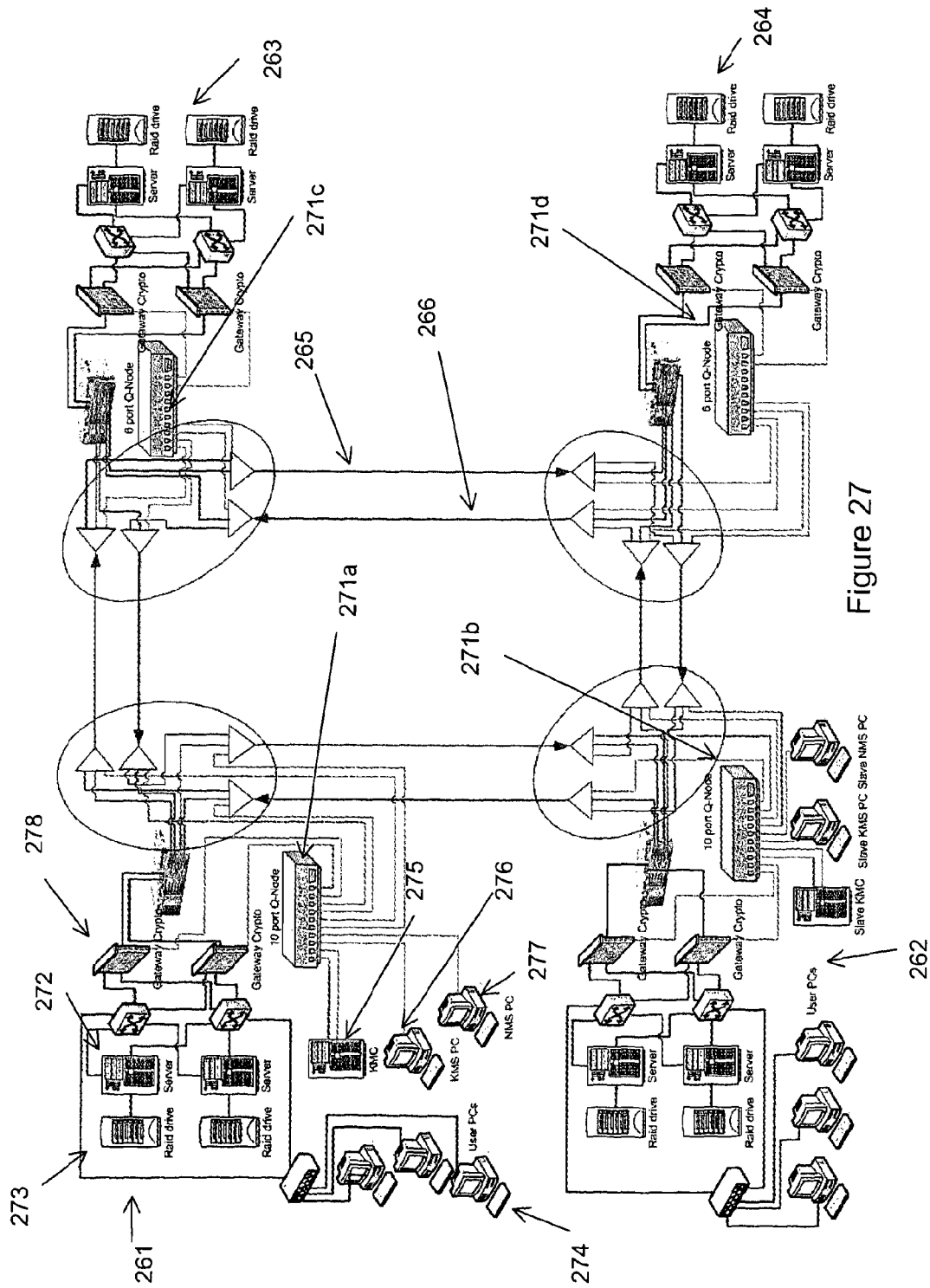
Figure 28A:
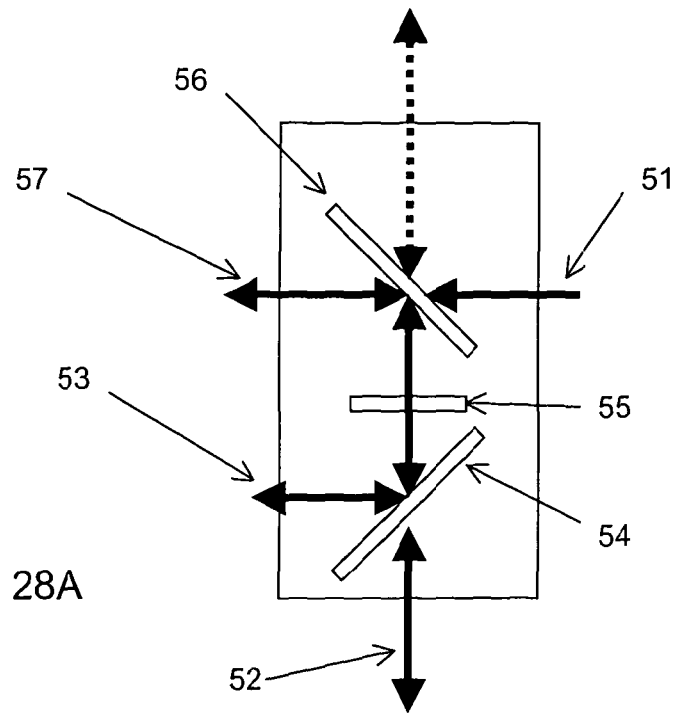
Figure 28B:
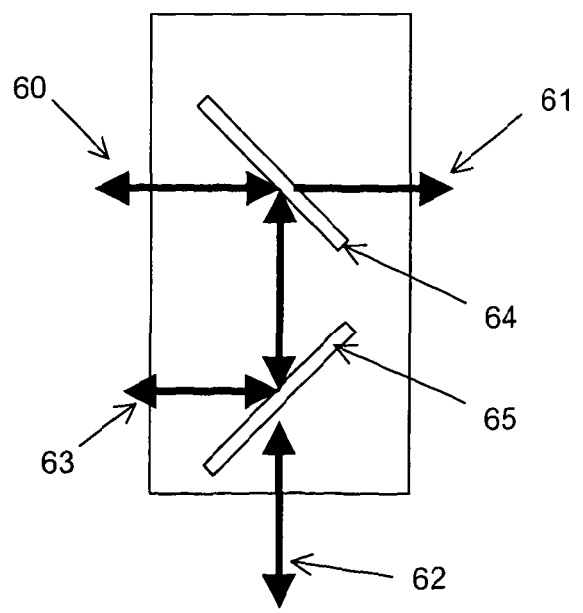
Figure 29A:
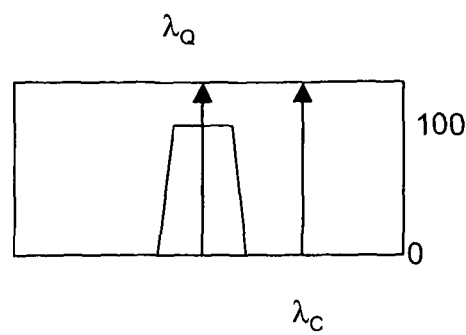
Figure 29B:
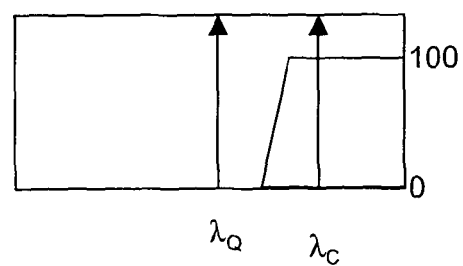
Figure 29C:
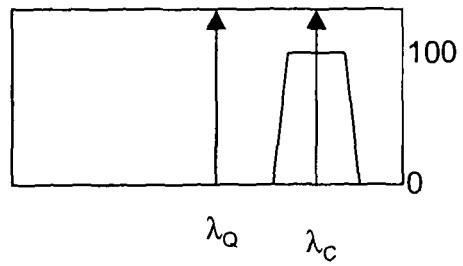
Figure 30:
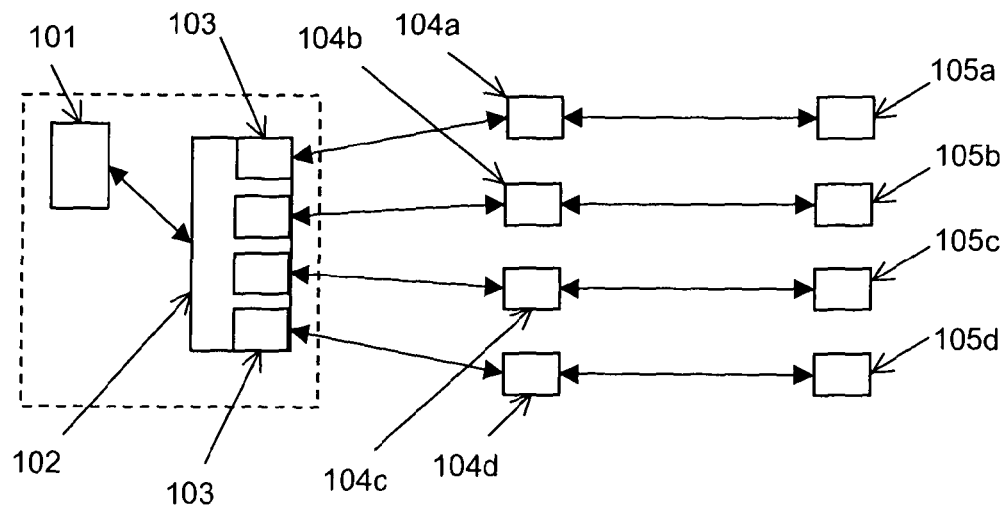
Figure 31:
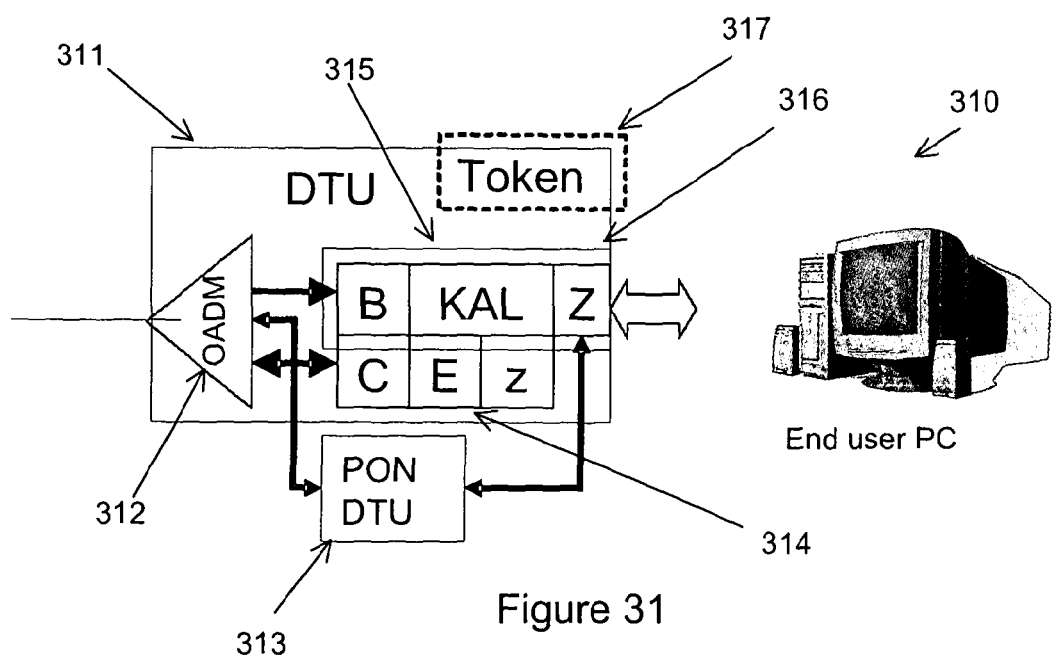
Figure 32:
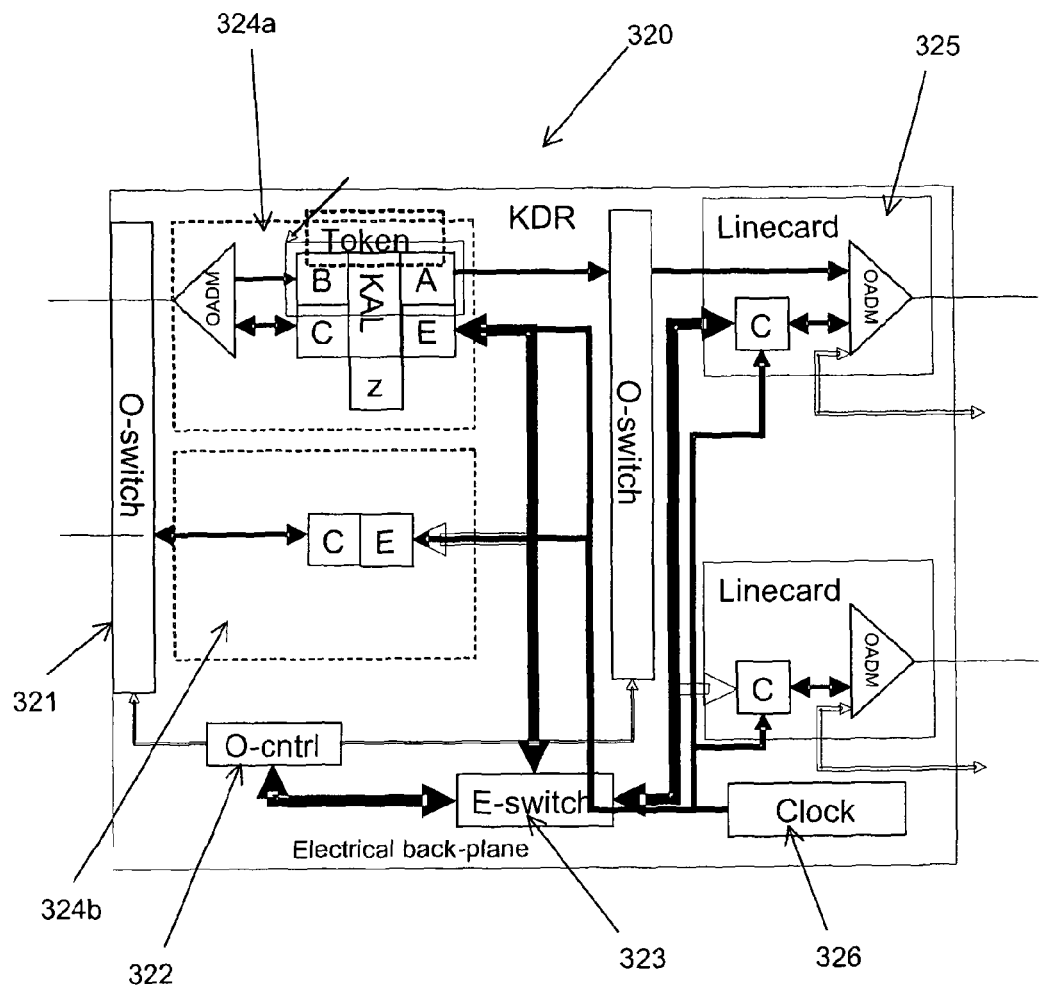
Figure 33:
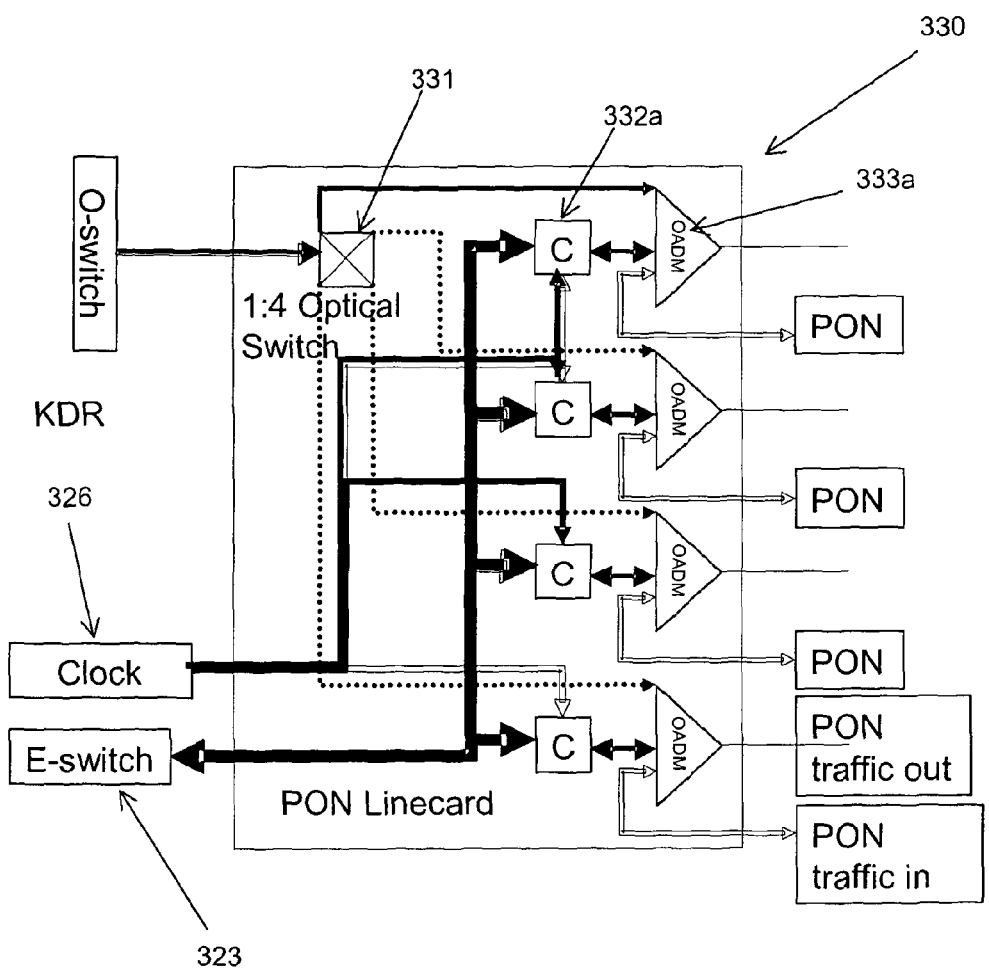
Figure 34:
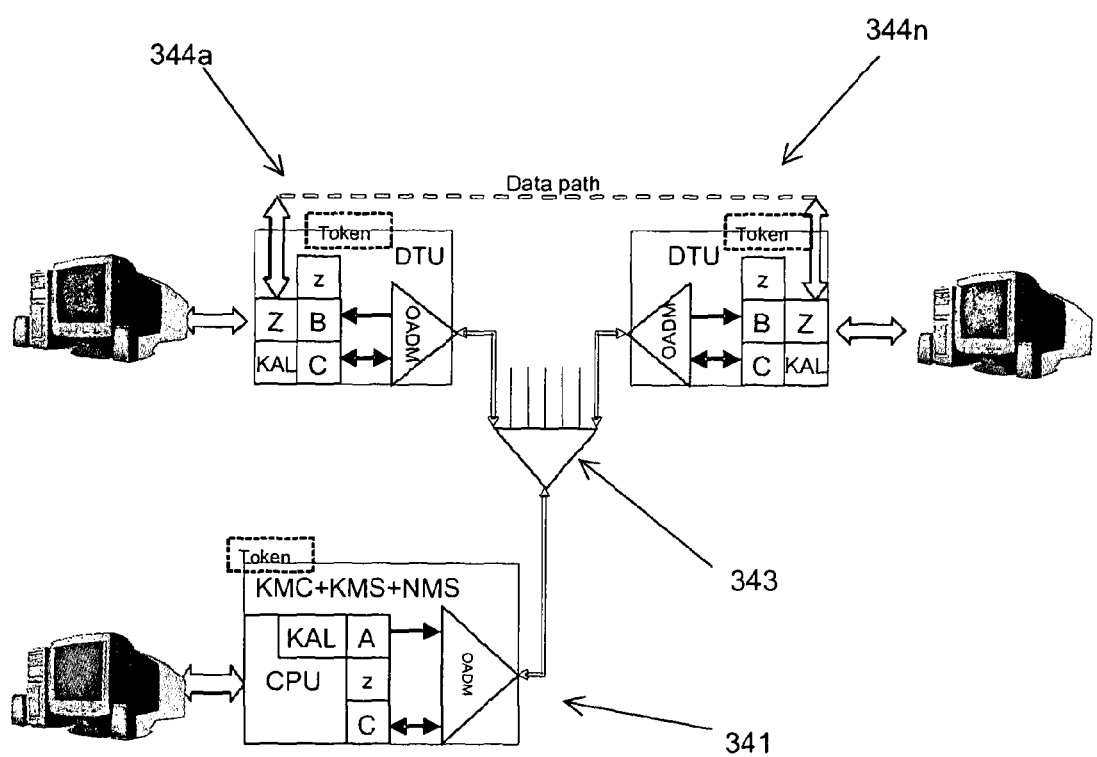
Figure 35:
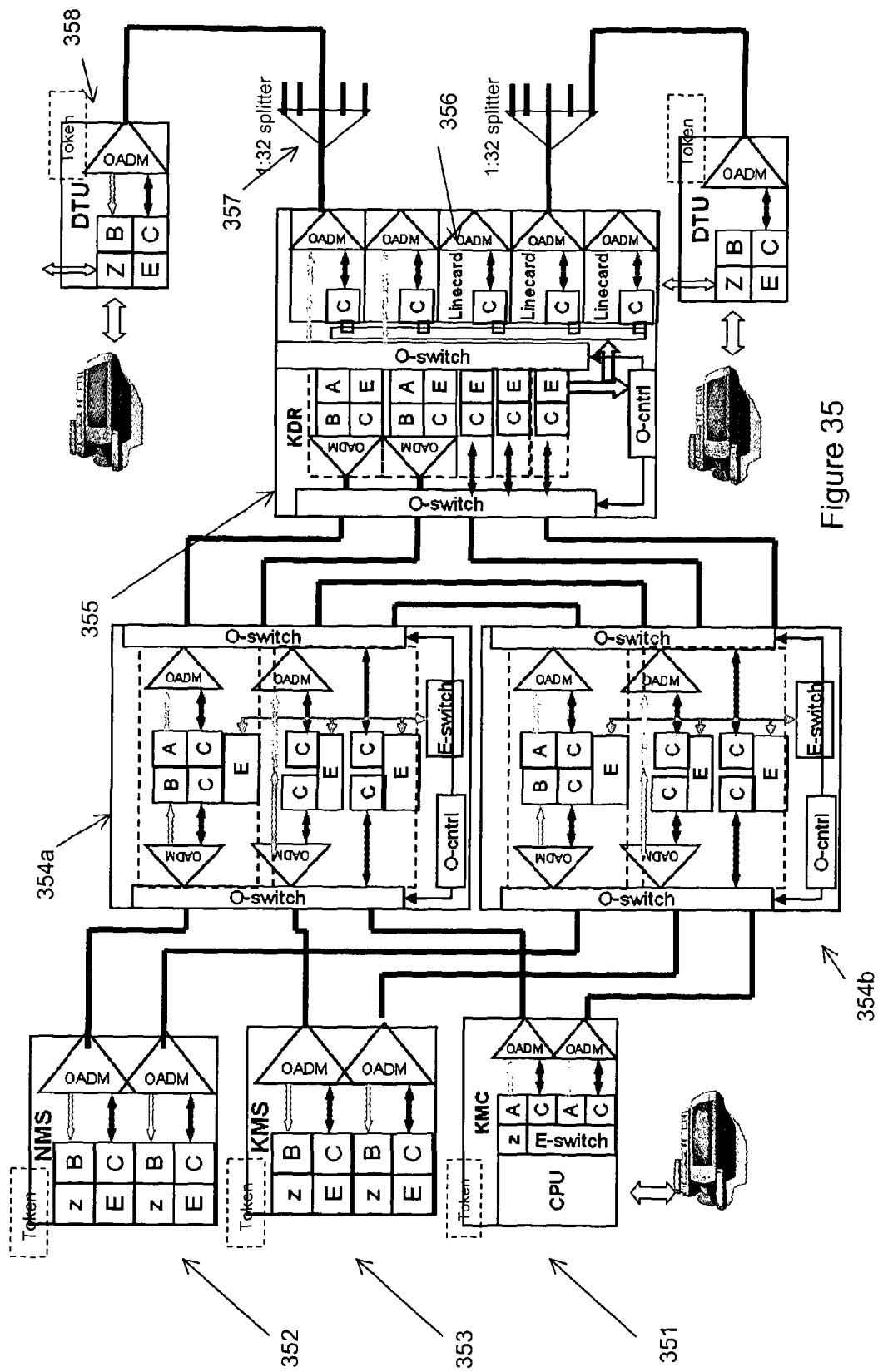
Figure 36:
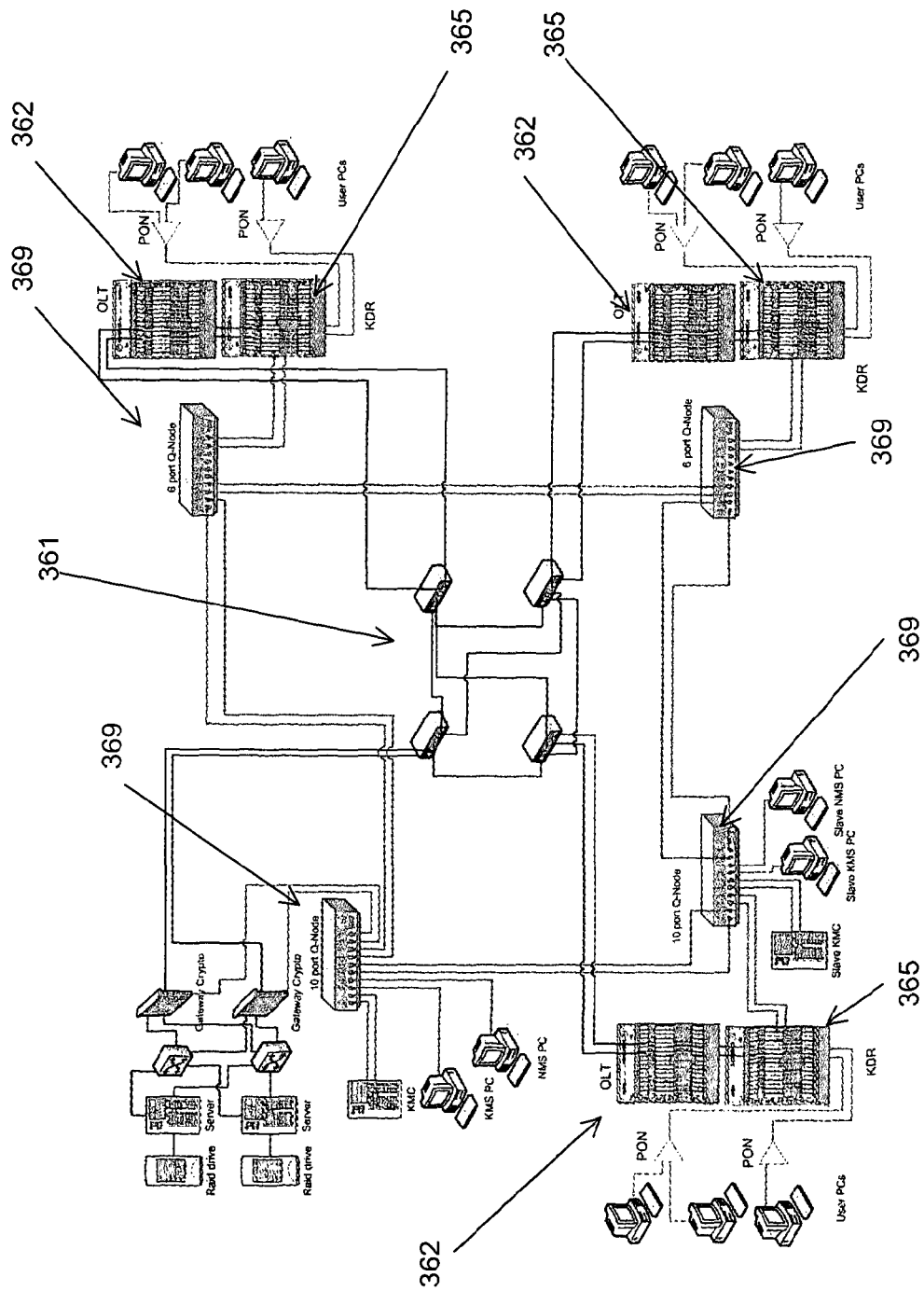
Figure 37A:
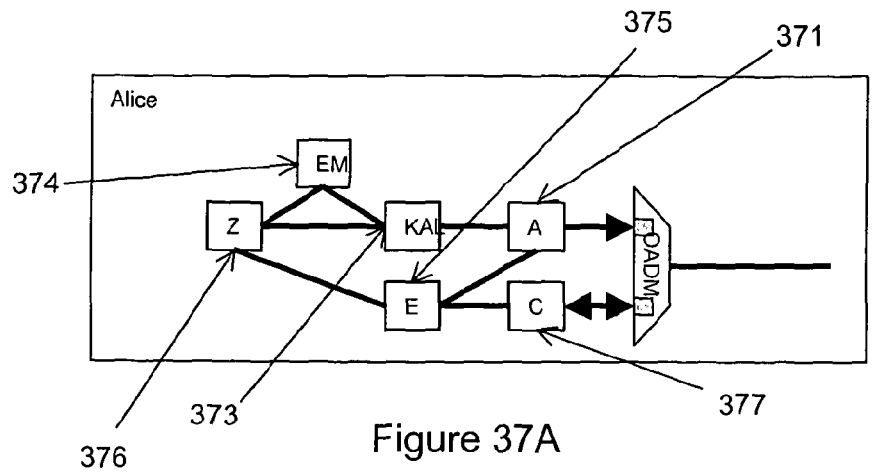
Figure 37B:
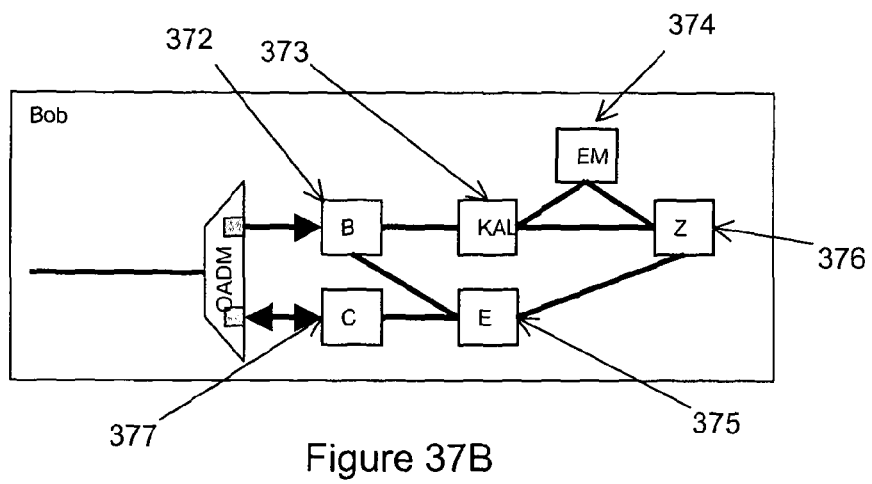
Figure 37C:
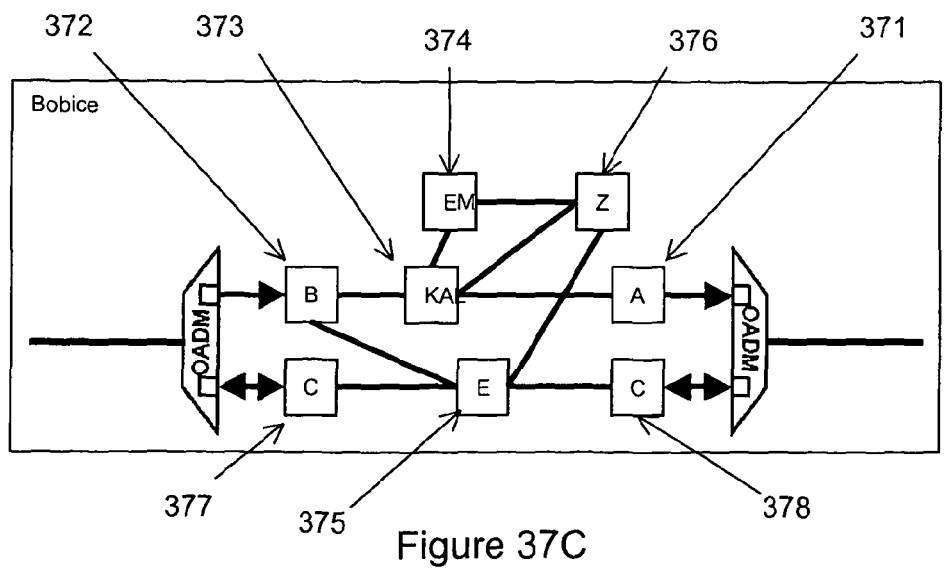

FIG. 3 indicates possible polarizations states for transmission by a quantum transmitter using a BB84 polarization scheme;

FIG. 4 indicates information exchanged by a quantum transmitter and a quantum receiver in establishing bits of a basic shared key according to a BB84 scheme;

FIG. 5A shows an embodiment of an optical multiplexer for use in combining a quantum QKD signal with classical signals;

FIG. 5B shows an embodiment of an optical multiplexer for use in separating a quantum QKD signal from classical signals;

FIGS. 6A, 6B and 6C illustrate the spectral properties of filters used in the multiplexers of FIGS. 5A and 5B;

FIG. 7 shows an embodiment of a quantum transmitter suitable for use in the quantum key distribution system of FIG. 1;

FIG. 8 shows an embodiment of a quantum receiver suitable for use in the quantum key distribution system of FIG. 1;

FIG. 9A shows a detector pair suitable for use in the quantum receiver of FIG. 8, and FIG. 9B shows detection response of the detector pair of FIG. 9A;

FIG. 10 shows in schematic terms a simple fibre optic network in which aspects and embodiments of the invention may be implemented;

FIG. 11A and FIG. 11B show an embodiment of a network node in which data traffic is split off from the quantum key distribution traffic;

FIG. 12 shows an intermediate quantum node according to an embodiment of aspects of the invention;

FIG. 13 shows a first embodiment of a quantum key distribution module according to aspects of the invention;

FIG. 14 shows a second embodiment of a quantum key distribution module according to aspects of the invention;

FIG. 15 shows a third embodiment of a quantum key distribution module according to aspects of the invention;

FIG. 16 shows a first embodiment of an intermediate quantum node with quantum key distribution modules according to aspects of the invention;

FIG. 17 shows a second embodiment of an intermediate quantum node with quantum key distribution modules according to aspects of the invention;

FIG. 18 shows an embodiment of an intermediate node employing a repeater for data traffic according to aspects of the invention;

FIG. 19 shows an embodiment of a key management centre according to aspects of the invention;

FIG. 20 shows a desktop unit as a first embodiment of an endpoint of a quantum key distribution network according to aspects of the invention;

FIG. 21 shows a network gateway unit as a second embodiment of an endpoint of a quantum key distribution network according to aspects of the invention;

FIG. 22 shows a data store unit as a third embodiment of an endpoint of a quantum key distribution network according to aspects of the invention;

FIG. 23 shows a first embodiment of a conventional fibre optic network for quantum key distribution according to aspects of the invention;

FIG. 24 shows a second embodiment of a conventional fibre optic network for quantum key distribution according to aspects of the invention;

FIG. 25 shows a third embodiment of a conventional fibre optic network for quantum key distribution according to aspects of the invention;

FIG. 26 shows a fourth embodiment of a conventional fibre optic network for quantum key distribution according to aspects of the invention;

FIG. 27 shows a fifth embodiment of a conventional fibre optic network for quantum key distribution according to aspects of the invention;

FIG. 28A shows an embodiment of an optical multiplexer for use in combining a quantum QKD signal with classical signals, including data signals;

FIG. 28B shows an embodiment of an optical multiplexer for use in separating a quantum QKD signal from classical signals, including data signals;

FIGS. 29A, 29B and 29C illustrate the spectral properties of filters used in the multiplexers of FIGS. 28A and 28B;

FIG. 30 shows in schematic terms a simple fibre optic network, particularly appropriate for a passive optical network, in which aspects and embodiments of the invention may be implemented;

FIG. 31 shows a desk top unit as an embodiment of an endpoint for a quantum key distribution passive optical network according to aspects of the invention;

FIG. 32 shows an embodiment of a key distribution rack for a quantum key distribution passive optical network according to aspects of the invention;

FIG. 33 shows an embodiment of a linecard suitable for use in the key distribution rack of FIG. 32;

FIG. 34 shows a first embodiment of a passive optical network for quantum key distribution according to aspects of the invention;

FIG. 35 shows a second embodiment of a passive optical network for quantum key distribution according to aspects of the invention;

FIG. 36 shows a third embodiment of a passive optical network for quantum key distribution according to aspects of the invention; and FIGS. 37A, 37B and 37C show interaction between cryptographic and QKD components in embodiments of quantum transmitter and receiver apparatus according to aspects of the invention.

DESCRIPTION OF SPECIFIC EMBODIMENTS

Specific embodiments will now be described which illustrate the application of the present invention. First of all, particular aspects of the invention will be described with reference to a simple arrangement with a direct connection between two nodes establishing a quantum key for use in subsequent communication. After this, further aspects of the invention will be described with reference to a conventional fibre optic network arrangement in which multiple nodes are present and in which the connection between two nodes may not be direct—exemplary networks are illustrated which may be constructed and operated according to the principles, and with the elements, described in the preceding parts of this section. Finally, the principles applied to conventional fibre optic networks are modified for use in passive optical networks, and exemplary networks are again described.

General Principles

FIG. 1 shows the basic elements of an implementation of quantum key distribution by a direct connection between two nodes according to an embodiment of aspects of the invention. A key distributing node 1 transmits optical signals over one or more optical fibres 3 to a key receiving node 2. The key distributing node 1 has a quantum transmitter 11, a first classical transmitter/receiver 12, and may have a first data transmitter/receiver 13. The key receiving node has a quantum receiver 16, a second classical transmitter/receiver 17, and may have a second data transmitter/receiver 18. In accordance with standard usage in this technical field, quantum transmitters will be identified as "Alice" and quantum receivers as "Bob", and these terms will be used interchangeably in the description which follows.

In principle, separate optical fibres may be used for quantum traffic, classical traffic, and data traffic. The classical traffic and the data traffic may be conventional digital signals transmitted according to existing optical data networking protocols. The classical traffic and the data traffic may readily be combined on to one fibre. The quantum traffic is very different, as has been indicated above and will be discussed further below—nonetheless it is found that this traffic may also be combined on to the same fibre as the classical and/or data traffic. Here, a first multiplexer 14 combines the quantum traffic, the classical traffic and the data traffic on to a single fibre 3, and a second multiplexer 15 separates the quantum traffic, the classical traffic and the data traffic to enable them to be processed separately.

A significant difference between the types of traffic is that the quantum traffic needs to be circuit switched, whereas the classical traffic and the data traffic may be packet switched (as will generally be preferred over any conventional communication network). This is because the quantum traffic relies on the presence of an unbroken path between the quantum transmitter and the quantum receiver for single photons to be sent and received in a given polarisation state. This places the quantum traffic at risk of path blocking—if a part of a designated path between the quantum transmitter and the quantum receiver is unavailable to the quantum traffic (for example, if it has been allocated to other traffic), there is no way for the quantum traffic to reach its destination. It will be discussed below how aspects of the invention address this potential problem for QKD systems implemented over conventional fibre optic networks.

The classical transmitters and receivers are conventional, as is the optical fibre, and will not be further discussed at this stage. Exemplary multiplexers and Alice and Bob units are discussed below, after a discussion of the method used for establishing a quantum key between Alice and Bob.

Figure 2:
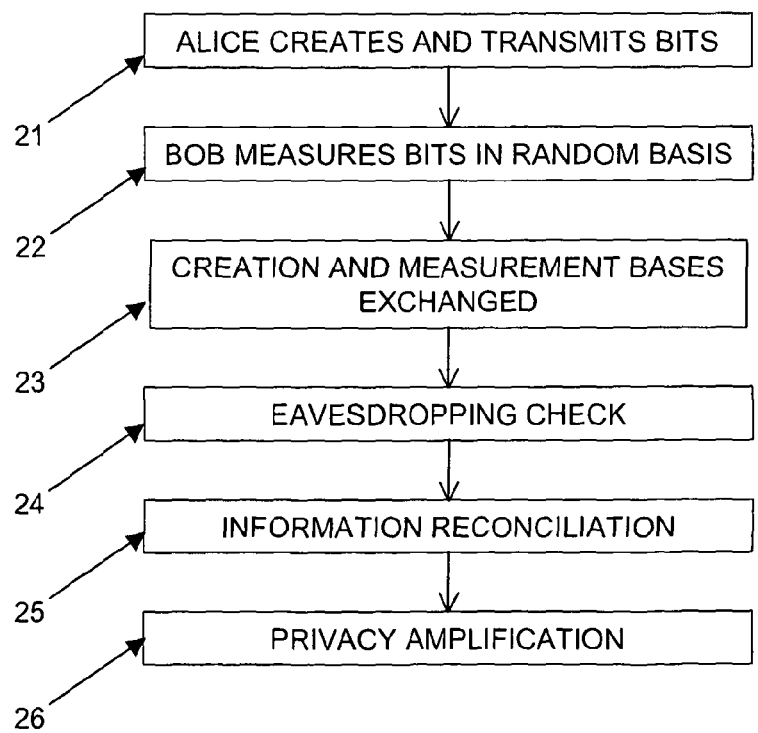
FIG. 2 illustrates schematically the steps in establishing a quantum key between two nodes according to a protocol such as BB84.

The method described follow the BB84 protocol for quantum key distribution, though the approach set out here may in principle be applied to other QKD protocols. The basic elements of the BB84 protocol were described briefly above—these are described in more detail below with reference to FIG. 2.

As indicated above, the first step 21 is for Alice to create and send a series of bits. For each single bit, this involves the creation of a random bit, the random selection of a base for transmission, the preparation of a photon polarization state representing the bit and its basis (as shown in FIG. 3—for example, 0 in the rectilinear basis is a vertical polarization state, and 1 in the diagonal basis is an 135° state), and the transmission of a single photon in this polarization state to Bob, with the state, basis and time of each photon sent recorded.

The next step 22 is for these bits to be received by Bob who makes a random selection of measurement basis for each photon received, and records time, measurement basis and measured result.

The next step 23 is a public exchange of information between Alice and Bob. First of all Bob communicates timing information for received photons, and the basis in which each photon received was measured, to Alice. Alice then determines which pulses corresponded to received photons, and communicates to Bob in which basis the photons sent in each such pulse were encoded. It is desirable for this exchange to begin with Bob to prevent redundant communication, as many pulses will not result in photons received at Bob. Each party then knows which photons have been encoded and measured on the same basis, and the associated bits may then be used in the secret key. FIG. 4 illustrates the information that is known by each party about each bit, and indicates which bits may therefore form a part of the key.

After this, the next step 24 is to check for the presence of eavesdropping. Alice and Bob do this by sharing an agreed subset of the bits. If there has been eavesdropping, then quantum indeterminacy requires that this will have introduced errors in Bob's measurements—there may be other potential sources of error too, but for security the measurements may in practice be treated as if all such error is the result of eavesdropping. For a non-zero error, information reconciliation and privacy amplification may be used to ensure that an identical key is shared between Alice and Bob with minimal information on it held by any Eve.

The step of information reconciliation 25 involves use of an error correction protocol over the public channel (for example, the cascade protocol described in the paper by Gilles Brassard and Louis Salvail entitled "Secret-key reconciliation by public discussion" in Tor Helleseth, editor, *Advances in Cryptology*—EUROCRYPT '93, volume 765 of *Lecture Notes in Computer Science*, pages 410-423. Springer-Verlag, 1994). This operates over a number of rounds, with the keys divided into blocks in each round and the parity of blocks compared. Binary searches are used to find and correct parity errors. After all blocks are compared, the keys are reordered in the same random way, and a further round of block comparison and correction takes place. These rounds continue until there is a high probability that Alice and Bob have identical keys—however, Eve will obtain additional information about the shared key through this process.

Eve's knowledge of the shared key is reduced by the final step 26 of privacy amplification, which is designed to reduce Eve's partial knowledge of the shared key from any of the earlier transmission steps. A universal hash function is chosen at random from a library of such functions to produce a shorter binary string from the original binary string. The amount of shortening is calculated in accordance with the maximum amount of information that Eve could have gained about the original key from eavesdropping upon the transmission steps in order to reduce the probability that Eve has any knowledge of the new key to a very low value.

It should be noted that while this process allows two parties to exchange a shared secret key, it does not in itself allow one party to know the identity of the other. A further step of mutual authentication using conventional cryptographic approaches is thus required once the shared key has been established to protect against a man-in-the-middle attack. In such an attack, an attacker (generally known as "Mallory") intercepts all communications between Alice and Bob, and acts as if he were Bob towards Alice, and as if he were Alice towards Bob. Alice would then agree one secret key with Mallory and Mallory would agree a different secret key with Bob. If there is a pre-existing shared secret—such as an identity key—known to Alice and Bob but not to Mallory, then this attack will be revealed in the mutual authentication process as Mallory will not be able to impersonate either Alice or Bob in this process.

Significant elements of the system illustrated in FIG. 1 will now be described in more detail. Transmitters/receivers 12, 13, 17 and 18 are conventional optical networking components and do not need to be further described—optical channel 3 may also consist of one or more conventional optical fibres. The quantum transmitter ("Alice unit") 11 and the quantum receiver ("Bob unit") 16 will be described in more detail below, but first the multiplexers 14, 15 will be described.

FIGS. 5A and 5B illustrate optical add-drop multiplexers used in embodiments of the present invention. FIG. 5A illustrates a transmitter multiplexer 14 which receives a signal from a quantum channel, such as quantum transmitter 11, and combines it with a classical signal. FIG. 5B illustrates a receiver multiplexer 15, which receives a composite signal containing both classical and quantum signals, and resolves the quantum signal from it to provide to a quantum channel component such as quantum receiver 16.

FIG. 5A illustrates the multiplexing of a classical QKD channel 52 and a quantum QKD channel 51 on to a single optical fibre. In this arrangement, the quantum QKD channel operates at the shortest wavelength (quantum QKD wavelength $\lambda_Q$, which may for example be at about 1.28 μm), the classical QKD channel operates at a wavelength slightly higher than the quantum QKD channel, but with sufficient spectral separation from it that classical and quantum traffic can be isolated without interference or other loss of information (classical QKD wavelength $\lambda_C$ may for example be at about 1.3 μm).

In the arrangements shown here, the data channel is not carried in to the quantum key distribution node. While it may be carried over entirely different channels, embodiments will be described below in which data traffic, quantum QKD traffic and classical QKD traffic are all carried over the same fibre, and in which data traffic is split off before and after the multiplexers shown in FIG. 5A and FIG. 5B. The data channel may use a conventional optical networking band (the data wavelength will be designated $\lambda_{PON}$, which may for example be at about 1.5 μm, though this may in practice be a range of bands used for a wavelength division multiplexed network). There is thus the possibility of combining data traffic, quantum QKD traffic and classical QKD traffic on a single optical fibre.

The classical QKD channel 52 passes through a low-pass filter 55. This leaves the traffic in the classical QKD channel quite unaffected. The purpose of low-pass filter 55, as shown in FIG. 6B, is to clean up the spectrum in the quantum channel in order to keep noise in this channel to a minimum. The combined classical channels are joined with the quantum QKD channel at the second multiplexing filter 56. As shown in FIG. 6A, this is a bandpass filter for $\mu_Q$, and will reflect light at $\mu_C$, so the channels combine for output at output port 57. It should be noted that even if there is noise present in the quantum channel band in the classical signal, this should be cleaned from the signal by second multiplexing filter 56—such noise will be at $\lambda_Q$, and so will pass straight through the filter and will not be reflected to output port 57 as are the classical signals.

It should be noted that the transmitter multiplexer 14 is one way for quantum QKD traffic—which passes only from Alice to Bob—but may be two way for classical traffic. While this is not essential (in that embodiments of the invention may be provided without this property) it will generally be most convenient for the data channel and the classical QKD channel to be bidirectional. Either of these channels may in fact be realised as a plurality of optical channels—for example, the data channel may use WDM and distribute data between a range of frequencies, and the classical QKD channel may use a pair of wavelengths, one for traffic in one direction and the other for traffic in the other direction, the pair being sufficiently close in wavelength that they can both be passed by a single band pass filter.

The arrangement shown in FIG. 5B is essentially similar, but in this case the quantum QKD channel 61 is to be dropped at the multiplexer from a composite classical and quantum signal. The composite signal is received at input port 60. The first demultiplexing filter 64—a bandpass filter for $\lambda_Q$, which may be the same component as second multiplexing filter 56—allows the quantum QKD channel 61 to pass through, while reflecting the classical channel. There is no need to clean up the quantum QKD spectrum (as this signal has already been dropped), so this composite signal passes directly through. Again, the multiplexer of FIG. 5B may be bidirectional for all classical traffic, while one-way for quantum QKD traffic (strictly, both the FIG. 5A and FIG. 5B multiplexers may be considered to be a multiplexer/demultiplexer for classical traffic and, respectively, a multiplexer and demultiplexer for quantum QKD traffic).

In the arrangement shown, quantum and classical traffic is effectively combined without compromise to either traffic type. As the quantum QKD traffic is in single photons and is thus particularly susceptible to noise, the path of this traffic is kept simple. It may be noted, for example, that in both the FIG. 5A and the FIG. 5B multiplexers, the quantum QKD channel is not reflected at any filters, but simply passes through the second multiplexing filter 55 in the FIG. 5A multiplexer to complete the combined signal leaving the output port, and simply passes through the first demultiplexing filter 64 in the FIG. 5B multiplexer. The quantum signal is thus disrupted as little as possible.

FIG. 7 shows an embodiment of a quantum transmitter (Alice unit) suitable for use as quantum transmitter 11 of FIG. 1. This embodiment has particular advantages for practical use, in particular that it can produce all required polarisation states and can provide continuous wave operation for calibration with the use of a single laser.

Laser 71 is a narrow spectral band semiconductor laser capable of both short single pulse operation and continuous wave operation—a telecoms grade laser (for example, a distributed feedback laser) would be suitable for this purpose. For quantum key bit generation, short single pulse operation is required—generation of 1 ns pulses at 100 MHz would be suitable for this purpose. Continuous wave operation is required for periods of up to 10 seconds for polarization calibration, as will be discussed further below. The laser properties should be well controlled, but this can be achieved with conventional off-the-shelf components. These may include a temperature control circuit including a temperature sensor and a Peltier cooler, a laser wavelength monitor and stabilizer (wavelocker) and a laser power monitor. It is desirable for laser 71 to be capable of being pulsed at at least two different intensity levels, as this allows for the use of decoy states (as proposed by W.-Y. Hwang in "*Quantum Key Distribution with High Loss: Toward Global Secure Communication*", Phys. Rev. Lett. 91, 057901 (2003)) to provide further protection against eavesdropping.

The quantum key bit path passes through two beamsplitters, the first splitting off a bypass path 75 for calibration (as discussed below) and the second allowing power to be monitored at first power monitor 78—this operates at high power with high speed of response to control pulses or continuous wave intensity (this functionality is required when decoy states are used). The intensity is then greatly reduced by fixed attenuator 72, which attenuates the signal so heavily that the probability of an output photon per pulse is reduced to less than 1.0 after the polarisation controller and the output optics. The attenuated signal then passes into polarization modulator 73, which is controlled in synchronisation with the laser 71 to provide the polarization state representing the random choice of bit and basis for each pulse. A polarization modulator with this functionality is described in the applicant's earlier patent application entitled "Electro-Optic Waveguide Polarisation Modulator" and published as WO2008/032048, the contents of which are incorporated by reference herein. Any photon produced will then pass to an output beamsplitter, where another power monitor 79 is provided (this is a slow response, time integrated detector to check that the signal has been appropriately attenuated)—a photon passing through the output beamsplitter and out through the fibre optic output 77 has the potential to establish a bit of the initial secret key (if measured by the quantum receiver in the same basis as which it was generated).

As has been indicated above, there is a bypass path 75—this is closed by optical shutter 74 during quantum key bit generation, but is used for calibration, and in particular to correct the polarization state. Correction of the polarization state is necessary because the optical path from Alice to Bob, and in particular the birefringence of the optical fibre between them, will result in some modification to the polarization state between generation at Alice and receipt at Bob. If uncorrected, this will result in errors in Bob's measurements. This modification can be compensated for by adjustment of the polarization state at Alice (as the polarization modulator described above is capable of producing an arbitrary polarization state), but this requires knowledge of the polarization modification introduced on the path from Alice to Bob, and this is extremely difficult to do from single photons. The modification needed may be found by using a signal of much greater intensity—known as a bright pulse—to allow the polarization modification on the path to be measured and hence compensated for. A difficulty with this approach is that optical components optimised for generating and receiving single photons are typically not suitable for generating and receiving much greater quantities of light. In prior art quantum transmitters and receivers, parallel signal generators and receivers have been used and the single photon components of Alice and Bob have been switched out of circuit—this is problematic, as new errors may be introduced by the use of different components.

The design of the Alice unit shown here enables polarization compensation without the use of different components at Alice. As the laser 71 is capable of both short pulse and continuous wave modes, which it is suitable to perform both single photon and bright pulse use. As has been indicated above, single photon use is achieved by very high attenuation of the main beam path—during single photon use shutter 74 closes off (by at least 100 dB of attenuation) the bypass path 75. For polarization compensation, the shutter 74 is opened and continuous wave mode is used—the contribution from the main beam path can now be ignored, as it is very highly attenuated and the bypass path 75 is not (typically, there may be 70 dB difference between the paths). The polarization modulator 73 is then controlled to determine the required compensation, as is discussed further below.

FIG. 8 shows an embodiment of a quantum receiver (Bob unit) suitable for use as quantum receiver 16 of FIG. 1. This embodiment has particular advantages for practical use, in particular that it is adapted for measurement and polarization compensation to be performed using the same detectors, one for each polarization state.

Light passes into the quantum receiver through a filter 80 (of the same type as the filter shown in FIG. 5B) which removes any light from wavelengths other than the quantum frequency, through an optic fibre input 81 and a collimating lens 82 to a 50:50 beamsplitter 83. This beamsplitter 83 performs the function of random selection of measurement basis—this is described in more detail in the applicant's earlier patent application entitled "Optical Transmitters and Receivers for Quantum Key Distribution" and published as WO2009/095644, the contents of which are incorporated by reference herein. For one basis of measurement, the photon passes through the beamsplitter 83 and then through a polarization rotator 84 into a polarising beamsplitter 85a which (if the basis is correct) will direct the photon to the correct photodetector 86a, 86b. If the basis is not correct, the photon may be directed to a random choice of photodetector—but this is of no significance as the measured bit will not form a part of the shared secret key. For the other basis of measurement, the photon is reflected by the beamsplitter 83 but is already correctly oriented with respect to the beamsplitter 85b which follows, so no polarization rotator is required in this path. As before, if the basis of measurement is correct, then the photon will be directed to the correct photodetector 86c, 86d.

An appropriate electrical control structure will be required at Bob—the skilled person will appreciate what will be necessary to control the components described and to drive them at the appropriate rates and conditions required. There will also be necessary control information passed over the classical channel—including in particular clock information necessary to provide synchronisation between Alice and Bob. Timing pulses are used to trigger Bob, or to enable a local clock to be extracted for Bob. Signals to indicate the start and end of a single block of photons will be interspaced with these—appropriate digital markers will be used to identify which pulses are which. Control information is similarly used to signal the start and end of bright pulses used in calibration. Bob also needs to monitor single photons to track the fixed time delay between the timing signal and the single photons, as they have different path lengths. One specific feature associated with the Bob unit is that it receives information to be treated as a cryptographic key. It therefore needs to comprise or be associated with a secure storage area appropriate to the safe storage of a cryptographic key (though in some environments this may not be critical, if the whole of the Bob unit is located within an area that may be trusted to be secure, such as the server room of a trusted party—though if a server room contains components dedicated to different end customers, components associated with one customer may be isolated from components associated with another customer, with the result that key exchanges between such components may be required).

Avalanche photodiodes (APDs) are typically used for detection of low light level signals. In these devices, a high reverse bias and appropriate internal design cause a small initial photodiode current to be internally amplified by a cascade process to provide a stable gain of 10 dB or more. This is in itself insufficient for single photon detection. Two alternative approaches to provision of detectors provide sufficient further improvement in the measured signal.

One approach is to use particularly highly biased avalanche photodiodes in which a single photon causes a breakdown of the device junction—these are known as single photon avalanche diodes (SPADs). These are expensive and sensitive components—they need to be unbiased to recover from detection, and the avalanche process may be triggered by thermal carriers. To reduce false detections (dark current) the high bias is only applied in a time interval corresponding to the expected arrival of a single photon. As these devices are optimised for single photon detection, they are also not suited to detection of a significantly highly current as would be used in polarization compensation—it may be necessary to switch in other detectors for this purpose, introducing complexity and the possibility of new errors.

A second approach is to use conventional APDs, but to use a pulse bias for 1 ns corresponding to the length of the laser pulse (and thus the window of time in which a photon may appear) and to use a matched pair of APDs as the detectors for a single basis. Conventional APDs selected for spectral response, low dark count and high efficiency may be used for this purpose, provided that they are available in matched pairs. This approach allows for the signals from the APD pair to be passed through a differential amplifier—this arrangement is shown in FIG. 9A, with APDs 96a and 96b forming a matched pair which provide signal into differential amplifier 98—FIG. 9B shows different traces resulting in this arrangement from a "1", a "0" and no detection.

This arrangement provides some advantages. One is cost, as a matched pair of APDs is currently significantly cheaper than a pair of SPADs. APDs are typically also more robust than SPADs. A further advantage is that the APD is more tolerant of significantly higher light input. This is advantageous, as this property can be used to achieve the measurements needed for polarization compensation without any change in detector. It is not necessary at these higher photocurrents to use a differential amplifier to provide the output signal—the outputs of all four APDs are measured individually by different circuits to integrate their total received power. These different power measurements form the basis for the polarization measurement. Polarization compensation measurements are thus carried out in normal component operation. As the optical path at Bob is then wholly unchanged between single photon and bright pulse operation, this allows for very effective polarization compensation to take place.

A method of establishing a required polarization compensation will now be described. This may be carried out before a transmission starts, or may be triggered by a determination that the bit error rate between Alice and Bob is unacceptably high. Alice and Bob are both then switched to bright pulse mode—the laser is switched to continuous wave mode, the bypass path is unshuttered, and the detectors are switched from single photon detection to a lower biased high photocurrent mode. The polarizing modulator is set to one of the polarization states for one basis, a bright pulse is sent, and the response measured at each photodetector to determine the received polarization state (and the correction required). This process is repeated for each polarization state of each basis, and the appropriate corrections determined. The corrections are then made—the results may be checked with further bright pulses to ensure that they are acceptable. Alice and Bob may then be returned to single photon mode.

Conventional Fibre Networks

In order to develop the arrangement of FIG. 1 into one which may be used in a typical optical networking environment, more developments are required. Quantum equipment is expensive compared to conventional optical networking equipment, so it is desirable to reuse the quantum components as much as possible. It is however also desirable to introduce redundancy to protect against failure, and to introduce multiple possible optical paths to prevent networking failures. Networking failures are of particular risk for a circuit-switched arrangement dependent on a direct one-to-one connection—such as the quantum QKD channel—as an inappropriate setting of one switch may block the connection completely. In aspects of the invention, the classical channel is used to address these issues by providing control of switching in intermediate nodes.

FIG. 10 illustrates a more complex QKD network in generic terms and introduces a number of components which will be described in more detail below. Key management centre 101 is central to the system, holding the master keys and effecting control over the other QKD elements in the system. An optical network is used to transmit the keys to a number of endpoints 105a, 105b, 105c and 105d through a number of intermediate nodes 104a, 104b, 104c and 104d. These intermediate nodes enable both quantum and classical QKD communication to pass between the key management centre 101 and the endpoints 105. A public WDM network 107 is shown linking the intermediate nodes 104 and the endpoints 105—over this network, data and QKD signals are all carried together, but data is split out before the QKD signals are processed. These separate system elements will now be described: firstly the structure of the intermediate nodes and the alternative designs available; secondly the key management centre 101 and the overall management of the system; and thirdly the general structure of the endpoints and of adaptations to particular endpoint functions. In the examples shown, the type of optical network indicated is a conventional fibre optic network—it will however be appreciated by the person skilled in the art that the principles described here may be deployed to produce embodiments of aspects of the present invention in other forms of optical network. Application to passive optical networks will be described further below.

The handling of data in a network 107 containing intermediate nodes 104 will now be described with reference to FIGS. 11A, 11B and 12.

The network will handle three different types of traffic: quantum QKD signals, classical QKD signals, and regular network traffic. The intermediate node 104 of FIG. 10 handles QKD traffic, but not data traffic (the regular network traffic). This regular network traffic may be routed according to any standard networking method and protocol appropriate to the optical network type. The classical QKD signal transmits data in packets, as for the regular network traffic, but it needs to be handled by the intermediate node. There are several reasons for this. One is that the classical QKD signal contains information which may determine the configuration of the intermediate node to effect appropriate routing of the QKD signals—for this purpose, the classical QKD signal is processed and a new classical QKD signal generated at each intermediate node. Another is that a routing appropriate for the QKD signals may not be appropriate for network traffic. The quantum QKD signal is circuit-switched rather than packet-switched, and given its sensitivity to disturbance it is desirable for this signal to be disturbed as little as possible. This signal is also not susceptible to conventional amplification, so if the path distance between the key management centre and the endpoint is too long, an alternative approach to ensuring the distribution of a valid key to the endpoint is required.

FIGS. 11A and 11B illustrate an exemplary intermediate node 114 with network elements around it involved in stripping the data traffic away from the QKD traffic. WDM traffic—comprising data traffic at $\lambda_{data}$ (which may comprise a range of wavelengths if the data is transmitted over a number of WDM channels), classical QKD traffic at $\lambda_C$, and quantum QKD traffic at $\lambda_Q$—is received at input port 111. This passes into a first data optical add-drop multiplexer 112 which is a filter of the type shown in FIG. 11B—this filter passes through traffic at the QKD traffic wavelengths but which reflects signals at $\lambda_{data}$. The data traffic is thus dropped into optical data networking node 113, which may be a networking node in all respects conventional to the optical networking protocol used to transmit data over the network—as this node 113 is conventional and not constrained by requirements of the present invention, it does not require further description here. The QKD signals pass into the intermediate quantum node 114, and will be processed appropriately to the role of the intermediate quantum node as described below. The QKD signals resulting from the quantum node 114 and the data traffic to be output from the conventional networking node are all received at a second optical add-drop multiplexer 115, again a filter with the properties shown in FIG. 11B. As before, this filter is arranged so that the QKD signals pass straight through, while the data signal is reflected. The assembled WDM signal is then transmitted out through output port 116.

This arrangement—in which data traffic is stripped away before the intermediate quantum node, and then added back afterwards—is appropriate to a fibre ring, of which examples will be shown later. In other network arrangements, the separation may be made at a different stage, and there may be no need to have a first multiplexer 112 or a second multiplexer 115 associated with a particular intermediate quantum node 114. For example, in a star network the data could be stripped away from the QKD traffic before a first intermediate quantum node, and added back just before a leaf node of the network. It will be appreciated that specific embodiments of an intermediate node may be involved only with QKD transmissions and not with network traffic—such may be the case within a data centre, for example, if intermediate nodes are needed for effective routing between a key management centre and the interface with the main optical data network. In these cases, no data traffic dropping functionality of FIG. 11 is required in proximity to intermediate quantum node 114.

FIG. 12 illustrates a basic structure for a quantum node such as quantum node 114 of FIG. 11. The FIG. 12 arrangement is generalised somewhat in that it indicates how multiple quantum nodes may be incorporated into one intermediate node—in the FIG. 12 case, a 2×2 arrangement is shown. This may be appropriate if separate communication paths are used for traffic from the key management centre to the endpoint, and from the endpoint to the key management centre. It should be noted that this first path type will need to pass quantum QKD signals, whereas this second path type may not need to do so.

At the input and output of the quantum node 121 are optical switches 121 and 129. These control the path of the QKD signals through the quantum node, and operate under the control of an optical switching control 123. This optical switching control 123 operates under the control of an electrical switch 124 and associated logic. Contained within the quantum node are two QKD networking cards 125 and 126. This is exemplary only—quantum nodes may have a greater number of cards as appropriate to the overall network technology. These may be of three different types—all three types are described below. These cards each have two optical input/output ports 127a and 127b, one in communication with each of the optical switches 121, 129, and also have an electrical input/output port in communication with the electrical switch 124. The general principle of operation is that QKD control and QKD networking information is conveyed over the classical QKD channel (along with other signals to establish a QKD connection required of the classical channel by protocols such as BB84). This information is extracted from the classical QKD channel at the QKD networking card, and relevant control information is provided to the electrical switch 124. The electrical switch 124 and its associated logic then controls the quantum node as required—including providing appropriate configuration of the optical switches 121, 129.

It can be seen that this arrangement allows alternative routes to be chosen through the intermediate node—for a 4×4 node, for example, significantly more combinations will be available than for a 2×2 node. This arrangement thus enables, for example, re-routing of the QKD signal to avoid a network fault—as has previously been indicated, this is otherwise a major problem for a circuit-switched channel such as the quantum QKD channel. The use of the classical QKD signal to change the path of the quantum QKD channel by reconfiguring the optical switches of the intermediate node is of particular significance in addressing the problem of path blocking.

The three different types of QKD networking card will now be described below with reference to FIGS. 13, 14 and 15.

FIG. 13 illustrates a first type of QKD networking card. In this card, termed a quantum glass-through card 130, the quantum QKD signal passes through without any processing or other disturbance, while the classical QKD signal is processed at the node and a new classical QKD signal generated. The quantum QKD signal and the classical QKD signal are separated at first quantum node add-drop multiplexer 131. This will be a band pass filter for $\lambda_Q$, with the quantum QKD signal passing straight through the multiplexer, and the classical QKD signal reflected from it (of the type shown in FIG. 6A). The quantum QKD signal passes straight through the node into second quantum node add-drop multiplexer 132—again, this is a band pass filter for $\lambda_Q$ with the quantum QKD signal passing straight through. The quantum QKD signal is thus as little disturbed by passage through the quantum glass-through card 130.

The classical QKD signal, by contrast, is processed at the node. The received classical QKD signal is received at first optical transponder 134 of classical traffic node 133, and electrical signals result at electrical node 135. This electrical node is in communication with the electrical switch 124 of the quantum node 120. Information in the classical QKD signal may then be used to affect the optical switching of the quantum node 120 to ensure appropriate routing of the QKD signals—the classical QKD signal may include all networking information relating to the QKD signals (for example, network managing traffic specifically for the QKD signals) in addition to information required of the classical channel by BB84 or whatever quantum key distribution protocol is used. A new classical QKD signal may be provided at the quantum node 120: the electrical node 135 either passes on signals received (such as timing and synchronisation signals) directly to second optical transponder 136 by electrical regeneration, or it acts as a traffic switch to pass on traffic from first optical transponder 134 or from external electrical switch 124, with the result being the provision of a signal for transmission by the second optical transponder 136 of the classical traffic node 133. The output classical QKD signal combines with the quantum QKD signal at the second quantum node add-drop multiplexer 132, and the combined QKD signals passes out through the card.

It should be noted that while the quantum QKD channel is one-way, the classical QKD channel will generally not be. Classical transmission is required in each direction—the classical QKD channel may therefore be bidirectional, with traffic shared by an appropriate protocol (this could be time division multiplexing, or two closely-spaced channels could be used for travel in each direction, in which case further wavelength demultiplexing and multiplexing is required before and after the classical traffic node 133).

If the quantum QKD signal will not pass on to the next node without unacceptable levels of error, then an alternative to the quantum glass-through card is required. Conventional amplification techniques (such as the use of an erbium-doped fibre amplifier) will clearly not work for a signal consisting of single photons in a particular polarization state. FIG. 14 shows the alternative card type used when "regeneration" of the quantum QKD signal is required. This "Bobice" card 140 contains an intermediate quantum node 141 rather than a glass through path. The classical node 133 of the Bobice card 140 is of the same type as for the quantum glass-through card 130, and the quantum QKD and classical QKD signals are split and reassembled as before. It should be noted that additional processing will be required at the quantum node, for reasons discussed further below.

The intermediate quantum node 141 comprises a Bob unit 142, an Alice unit 144, key agreement logic 143 to enable agreement of keys both upstream and downstream of the intermediate quantum node 141, and a cryptographic token 145 to provide the intermediate quantum node 141 with an identity that can be identified with some degree of confidence with the intermediate quantum node 141 by any party interacting with it. The intermediate quantum node 141 is contained within a tamperproof boundary 146 to prevent physical or logical intervention with the node (as it contains key and identity information). The skilled person in this area will appreciate what technologies will be appropriate for use in such a tamperproof boundary according to the level of security required—technologies used in tamperproofing are reviewed in Anderson et al, "Cryptographic processors—a survey", University of Cambridge Computer Laboratory Technical Report UCAM-CL-TR-641, for example. As classical regeneration of the quantum QKD signal is not possible, the intermediate quantum node 141 instead agrees a first key with the originating Alice—allowing the quantum QKD signal to terminate at this point—and agrees a second key with a succeeding Bob. This process allows quantum QKD communication over an optical path that would otherwise be much too long for a quantum QKD signal to survive without unacceptable errors.

The process for agreement of upstream and downstream keys by an intermediate quantum node is the subject of the applicant's prior patent application entitled "Quantum Cryptography Apparatus" and published as WO2009/093036—the basic operating principle is described here, but the person skilled in the art will consult this earlier application (which is incorporated by reference herein to the extent permitted by law) for further implementation detail. The basic operating principle is that the original Alice and the Bob unit 142 of the intermediate quantum node 141 are capable of agreeing a key between them, and the Alice unit 144 of the intermediate quantum node 141 is then capable of agreeing a new key with a downstream Bob—however, this new key is determined in at least some aspect by the original Alice rather than by the intermediate quantum node 141 itself. The downstream Bob can be considered to be agreeing a key with an Alice formed by a composite of the original Alice and the intermediate quantum node 141.

Bobice cards may be used in contexts other than providing a quantum QKD alternative to the regeneration of signals where communication paths are too long. The present applicant's earlier International Patent Application No. GB2009/001226, entitled "Quantum Key Distribution Involving Moveable Key Device" and filed on 15 May 2009 (the disclosure of which is incorporated by reference herein to the fullest extent permitted by relevant law), describes a Bobice element with a quantum receiver and a quantum transmitter adapted to be moved from a first network to a second network physically remote from the first network. This allows for QKD agreement to be made between nodes physically remote from each other not linked directly by a quantum QKD channel, or series of quantum QKD channels. Bobice card 140, or an intermediate node containing such a Bobice card, may be used to achieve this functionality.

A third card type is shown in FIG. 15—this classical card 150 is adapted to carry only a classical QKD signal, with no quantum QKD signal. The classical card 150 thus needs only the classical node 133 as shown in FIGS. 13 and 14, with no need for multiplexers or any quantum QKD path. This has some advantages in simplification of individual nodes and of appropriate signal handling in the return path.

In practice, classical card 150 may be used to replace a quantum glassthrough card 130 or a Bobice card 140 when key agreement by QKD is no longer required—for example, where QKD agreement has been used in initial set-up of a network, but wherein subsequent key agreement (when required) is by conventional cryptographic means. As a classical card 150 is of significantly lower cost than a Bobice card 140 in particular, this approach may be useful in minimising the overall cost of the network and its management.

FIG. 16 shows an exemplary quantum node 160 with a Bobice card 161 providing for key distribution by QKD from the key management centre towards endpoints, and a classical card 162. FIG. 17 shows a further exemplary quantum node 170, this time with a quantum glass-through card 171 for key distribution by QKD, and a classical card 172. The two exemplary nodes 160 and 170 are functionally similar, differing only in whether the quantum QKD signal received at the node is capable of passing through to the next set of possible nodes without unacceptable error (in which case the quantum glass-through card is used) or is not (in which case the regenerative Bobice card is used).

It should be noted here that it is quite possible to amplify classical signals conventionally, even though this is not possible for the quantum QKD signal. FIG. 18 shows another node type—this node is a Bobice repeater 180, in which the quantum QKD signal is extended using the approach discussed above, but in which the data is also amplified using an erbium-doped fibre amplifier (EDFA) 188. In contrast to the intermediate nodes shown above, this node handles data signals as well as QKD signals, the data signals being split off by first and second multiplexers in the manner shown in FIG. 11A The classical QKD signal does not need to be amplified, as it is generated anew at any intermediate node. First and second multiplexers 181, 189 split off the data traffic, with the QKD traffic then passing in to a Bobice card 161 as described above. The data traffic is amplified conventionally through EDFA 188. This node type may be particularly suitable for use before a long hop to the next node (or possible node) in the network. It can be noted that no switching is required for the QKD traffic for this quantum repeater design, but that it is logical for the quantum node to be a Bobice card 161 as if the data traffic requires amplification, it can be expected that the quantum traffic would require regeneration.

FIG. 19 illustrates a key management centre (KMC) 190. This is the central unit of the key distribution system, though among the embodiments described below are ones which use multiple peer KMCs—this may be desirable even where not required by overall system capacity in order to provide redundancy as a defence against system failure. Key management centre 190 of FIG. 19 is provided with channels for use in communication with peer KMCs—such channels need not be present where peer KMCs are not used.

Key management centre 190 includes a central processing unit 191 which performs key management and network management functions (associated with this central processing unit 191 there will also be secure storage—this is not shown explicitly in FIG. 19). The KMC 190 also has a security token 192 which provides one or more identities for the KMC. The KMC 190 has a master Alice unit 193a with key generation and agreement logic 194a. Master or domain keys are generated by the CPU 191, which also provides the seed for random number sequences generated by key agreement logic 194a for transmissions by Alice unit 193a, so that quantum key distribution may be used to distribute the domain key to the endpoint. Signals for the classical QKD channel are provided through an electrical switch 195a, which feeds into an optical transponder 196a which provides the classical QKD signal. Electrical switches 195a for each card connect to a master electrical switch 195N for the key management centre 190 connected to the CPU 191. Though less inherently secure, in some embodiments an external connection to the master electrical switch 195N may be provided to allow external control—this may be appropriate where the key management centre 190 is itself located within a facility considered to be sufficiently secure. The quantum and classical QKD signals are combined in multiplexer 197a, and transmitted out to intermediate quantumnodes. As before, this is one-way transmission for the quantum QKD signal, but classical QKD signals are received by the optical transponder 196a and the information from them relating to key agreement returned to key generation and agreement logic 194a, which the information relating to network and key management is returned to central processing unit 191. As is generally the case for system elements including either an Alice or a Bob unit, a tamperproof boundary 198 is provided around the master Alice unit 193a. As key and identity related information is generally available within the KMC 190, it is desirable for the KMC 190 either to be in a secure location or for a tamperproof boundary 199 to be provided around the KMC 190 itself.

To enhance security the Alice and Bob cards contain on-board crypto units which encrypt classical traffic between QKD devices. This affects the BB84 protocol messages (but not timing and synchronisation signals) so that an eavesdropper cannot easily gain any information about the key exchange/set-up process. Likewise the crypto unit can also be used to encrypt NMS messages where these may be of a sensitive nature.

The interaction within QKD devices between crypto units and other system elements will now be described in more detail with reference to FIGS. 37A, 37B and 37C, which respectively illustrate schematically an Alice unit, a Bob unit and a Bobice card.

As previously indicated, the Alice unit contains a quantum transmitter 371 and a classical transceiver 377. The quantum transmitter 371 sends single photons in a pulsed pattern as previously described (individual pulses have a non-zero probability of a photon transmission event, rather than necessarily representing transmission of a photon). The quantum transmitter 371 is adapted for polarisation calibration as previously described, and it can derive its own internal clock. Timing signals and other control information are received through electrical switch 375. The key agreement logic 373 coordinates all QKD functions for the quantum transmitter, in particular the distribution of key-related information to downstream Bob units and the agreement of keys. The key agreement logic 373 interacts with an element manager 374 for the Alice unit—the element manager monitors the elements of the Alice unit and provides NMS messages to be sent over the classical channel. These messages may include, or be in response to, KMS messages received by the element manager 374 from the key agreement logic 373. Element manager 374 passes messages to crypto unit 376 for encryption by whatever key has been agreed as appropriate for transmission to the message recipient. The crypto unit 376 encrypts the message appropriately and passes it on to electrical switch 375 for transmission through classical transceiver 377 and on to the classical channel. The electrical switch 375 is adapted for message handling in both incoming and outgoing directions—encrypted messages are also received through classical transceiver 377 and sent to the crypto unit 376 for decryption—these may then be interpreted and acted upon by the element manager 374.

The functional arrangement of the Bob unit mirrors that of the Alice unit, as can be seen from FIG. 37B. The quantum receiver 372 receives single photons through the quantum channel and timing information by means of the classical channel through the electrical switch 375. Standard off-the-shelf components can be used to extract a clock from these timing signals, an using a time delay determined between them, Alice and Bob can be synchronised. The key agreement logic 373 takes the Bob role in agreeing a key with Alice, and provides KMS and monitoring information to the element manager 374 as for the Alice unit. The element manager 374, the crypto unit 376 and the classical transceiver 377 all interact directly or indirectly with the electrical switch 375 and each other in the same manner as for the Alice unit described above.

The functional arrangement of the Bobice card is a composite of that of the Alice unit and the Bob unit, as can be seen from FIG. 37C. The functions of the quantum receiver 372 and the quantum transmitter 371 are exactly as described above for the Bob and Alice units respectively. The Bobice card has two classical transceivers 377, 378—a first classical transceiver 377 sharing a multiplexer with the quantum receiver 372, and a second classical transceiver 378 sharing a multiplexer with the quantum transmitter 371. The other elements present in both the Alice unit and the Bob unit—the electrical switch 375, the key agreement logic 373, the element manager 374 and the crypto unit 376—are also found in the Bobice card, though only a single instance of each element is required. The key agreement logic 373 thus handles key agreement for both the quantum receiver 372 and the quantum transmitter 371, the crypto unit 376 handles encryption and decryption of messages sent and received over the classical channel in either direction, and the element manager 374 monitors all elements of the Bobice cards and provides NMS messages for transmission in both directions.

In addition to the master Alice unit 193a, a peering Alice unit 193b and a peering Bob unit 193c are also shown. These provide a means for the KMC 190 to exchange keys with one or more further KMCs, in order to provide redundancy or to increase overall system capacity. The peering Alice unit 193b provides key generation for secure communication with another KMC, whereas the peering Bob unit 193c provides key receipt and storage for the same purpose. This arrangement allows for mutual authentication between connected KMCs.

These Alice and Bob units may be provided as plug-in cards, so the functionality of the KMC 190 may be varied according to system needs. If no peering with another KMC is required, there may be no need for peering channels (and hence for Bob units) in the KMC. If appropriate to the system, there may also be multiple channels to intermediate quantum nodes, or multiple peering channels.

The functions performed by central processing unit 191 will now be described in more detail. These essentially relate to key management, and more generally to security management, throughout the system over which keys are distributed. This may also involve network management of the QKD channels. As the QKD channels are routable at the intermediate quantum nodes independently of the data traffic, the QKD channels form their own logical subnetwork within the overall optical network, and this logical subnetwork requires its own network management system.

The KMC 190 may manage one or more security domains. For each security domain, the KMC 190 not only holds (and in most implementations generates) the master security domain keys, but also manages aspects of each security domain. The KMC 190 will implement a key management system. Features of this may include scheduling domain key updates, negotiating transfer keys with Bob devices for encrypting domain keys, and logging and managing a record of key events for each security domain. The KMC 190 therefore needs to generate, receive and interpret key management system messages, and should also have an operator interface for the key management system to allow an administrator to configure it appropriately (this may be, for example, by use of a trusted PC as a terminal—such a PC should at least be authenticated by the KMC 190). In order to ensure that the KMC 190 is dealing, directly or indirectly, with known nodes (and so to prevent a man-in-the-middle attack), the KMC 190 should hold authentication keys for each piece of QKD kit that it is to control.

Key management system messages for provision to other nodes in the system are provided to the classical QKD channels associated with the Alice and Bob units in the KMC 190. These need to be incorporated into an overall messaging structure along with other information that is to be transported along the classical QKD channels—such as the "classical channel" information required in key agreement according to protocols such as BB84. The classical QKD channels therefore need to support an appropriate networking protocol, and also require a network management system (NMS) to manage the network provided by the quantum nodes (key management centre, key distribution racks, intermediate quantum nodes and endpoints) and messaging over this network. This NMS may be run from KMC 190, though it may also be run separately as much of the associated information is separable from key management—however, NMS messages relevant to security should be received by the central processing unit of the KMC 190, which will also be the source of security-related NMS messages to be transmitted over the network.

The NMS runs over the classical QKD channel, using packet-based messaging. NMS packets will thus be processed at every intermediate quantum node, and will be routed to the required destination accordingly. NMS messages may if required be encrypted (to hide content and to confirm that they come from an authenticated source). As indicate above, security-related messages—such as, perhaps, polarisation indication which suggests an attempt to tamper with the system—will be routed to the key management centre. More generally, the NMS will be used to enquire about, or to report on, the following: status of network elements, running conditions and traffic levels on the network, current network configuration and alerts. The NMS will also be able to start up, reconfigure, shut down, add or delete network elements. Such features are normal features of an NMS—all that is unusual here is that the NMS relates to a logical network running over particular wavelengths of an optical WDM network.

As discussed above, it is desirable to improve the resilience of the overall system through redundancy of key components—otherwise failure at a single point may disable all or a significant part of the network. Duplication of a key management centre (this may be in other parts of a local network, possibly in other buildings altogether) is described above, but such redundancy can also be used for other elements (such as KMS and NMS administration). An intermediate quantum node may have capacity for several additional cards beyond those described above—hot swapping to achieve different network topology may also be an option. Similar approaches may be taken within the key management centre. Switches and controls may also be doubled, and alternative paths to endpoints provided to prevent isolation by failure of an intermediate node. Such use of redundancy may be used efficiently throughout the network, save perhaps at the endpoints (where full redundancy would require an additional QKD path for every endpoint device) unless these are of very high importance.

Different endpoints (leaf nodes) of the QKD network will now be described. All these endpoints require some form of Bob node, as each needs to agree a key directly or indirectly with the key management centre. Different endpoints will however differ according to their overall functional role. FIGS. 20 to 22 all provide examples of endpoints—each has a different function, and incorporates Bob functionality accordingly.

FIG. 20 provides an example of an end user endpoint—in this case, desktop unit 201 for incorporation in personal computer 200. The desktop unit 201 contains an optical add drop multiplexer 202—this does not process the network traffic, which has been provided separately for processing by a desktop networking unit 203. The endpoint classical QKD unit 204 receives classical QKD signals from the multiplexer (and provides generated classical QKD signals for transmission back to the preceding Alice unit to the multiplexer) and together with the endpoint quantum QKD receiver (Bob unit) 205 and incorporated key agreement logic establishes one or more keys with the preceding Alice (and thus directly or indirectly with the key management centre). At least one established key is used for encryption and/or decryption of network traffic—such keys are provided to the desktop networking unit 203, which uses them to decrypt or encrypt network traffic accordingly. Traffic which has been decrypted is passed to the desktop PC 200, and traffic from the desktop PC which is to be encrypted is passed to the desktop networking unit 203. A tamperproof boundary 206 is placed around the Bob unit—however further tamperproofing may in practice also be desirable for other components of the desktop unit with access to key-related information (such as the desktop networking unit 203), as such keys should be stored securely. The add-drop multiplexer 202 may be implemented, for example, using the functionality shown in FIG. 5b and described above. The desktop unit 201 also contains a security token 207 to provide an identity so that the desktop unit 201 can be authenticated (typically by a first exchange of encrypted data traffic once a key has been agreed by the relevant QKD protocol, as discussed above).

It should be noted that a PC used to administrate the key management system and/or the network management system of the QKD network may be of this type—messages may be passed back over the data network by standard means for transmission through the QKD network as necessary, and the only requirements on such an administrator PC are that it is as secure as is appropriate to the sensitivity of the information that may be obtained from it. It may however be desirable for an administrator PC to be located at an intermediate node, rather than a leaf node, to reduce the chances of it being isolated by a network fault.

A further endpoint type is shown in FIG. 21. This endpoint is a QKD network gateway unit 211 associated with a network gateway 210 between the relevant QKD security domain and other networks. The elements of the QKD network gateway unit 211 are generally similar to those of desktop unit 201 and have been numbered similarly where the same function is performed. The handling of data traffic is somewhat different, in that data traffic is stripped out before the QKD network gateway unit 211 and thus does not pass through optical add drop multiplexer 212 at all. Keys for encryption and decryption of network traffic are held in the Bob unit, which is adapted so that network traffic requiring encryption or decryption is processed directly at the Bob unit (which is provided in a tamperproof enclosure). This may be used, for examples, in arrangements where internal traffic is unencrypted, but is encrypted before transmission outside an internal network.

As for other endpoints, a security token 217 is provided to provide an identity for the endpoint unit. In this case, however, a removable security token 217 is used, the token generally being kept by a trusted party (such as a network administrator). This security token 217 is used as described above to authenticate the endpoint unit when a key has been agreed by QKD. Removal of the security token 217 reduces the likelihood of an effective attack on the network—this may be of practical significance, as it may be necessary to locate a network gateway 210 and associated QKD unit in a less physically secure location than other components of the QKD system. Normal processing of network traffic does not require further authentication, so this is not compromised by removal of the security token 217. Authentication will be required for upgrades or maintenance—if no authentication is provided at these times, relevant functionality (if desired, the entire functionality of the network gateway 210) is shut down.

FIG. 22 shows a QKD data encryption unit 221 for use with a data store 220—this data store 220 is a memory to hold in unencrypted form information which has been transmitted as encrypted traffic in the QKD network. Functionally, the QKD data encryption unit 221 is very similar to the QKD network gateway unit 211—data traffic is split off outside the unit, and is only provided to the Bob unit for decryption as required. Again, a removable security token 217 is used for the same reasons and with the same consequences as before. The data store 201 contains in encrypted or unencrypted form, as required, information transmitted securely over the wider data network—it will generally be appropriate for the data store 220 to be in a secure environment or to be protected in a manner appropriate to the sensitivity of the information stored within it.

This approach to network construction is shown in the following examples.

FIG. 23 shows an embodiment of aspects of the invention providing an extended point-to-point connection. At the network centre 231 there is the key management centre and administration for the key management system and the network management system (a PC 232 is provided as a management interface. The data could be transmitted on a separate network, or (as described above) over the same fibre as the quantum QKD and classical QKD signals. An intermediate node 233 is required as a relay between the network centre 231 and a desktop unit 234 at the endpoint as the distance between the network centre 231 and the desktop unit 234 is too great for the quantum QKD signal travel without introduction of unacceptable levels of error. This relay functionality is achieved with a Bobice card in the manner described above. A domain key may thus be shared between the network centre 231 and the desktop unit 234 for a desktop PC 235—a security domain can thus be formed between them. Again, traffic can use the same fibre or a separate one (this applies to succeeding examples too—for convenience, it should be understood in the descriptions that follow that the data and quantum signals may be transmitted over the same fibres unless explicitly stated otherwise). This arrangement is simple, but has no resilience or redundancy.

FIG. 24 shows an embodiment of aspects of the invention providing a simple network useful for external data centres. In this arrangement, data traffic is only encrypted outside secure premises—in this case, this is whilst on public WDM network 241. Decryption may take place at an appropriate endpoint—a data cryptography unit 242 attached to a public data store 243 is shown as an exemplary endpoint. Data traffic is unencrypted within a central office 240—a border gateway 244 encrypts outgoing traffic and decrypts incoming traffic. For QKD purposes, this border gateway 244 is an endpoint. The central office is provided with some redundancy—two administration sites 245a, 245b are provided, each with a key management centre and key management system and network management system capability. Connections between QKD components within the central office 240 are provided by an internal quantum node 246—in this case a 4×4 quantum node. Use of an internal quantum node in this way reduces the amount of QKD-enabled kit that would otherwise be required, and provides several routes between QKD-enabled kit to increase network resilience. The use of two data stores 243 provides redundancy for further functionality.

More complex network arrangements will generally benefit from the introduction of fibre rings. FIG. 25 shows a quantum node arrangement suitable for use in a fibre ring. Incoming data traffic is stripped out by a data optical add-drop multiplexer 251 and passed through fibre optic transmission gear to a network gateway 252 associated with a border gateway cryptographic unit 253. The QKD signals pass through the data multiplexer 251 into an intermediate quantum node 254—the classical QKD signals are processed at the intermediate quantum node 254 with the quantum QKD signals glassed through. The QKD signals emerging from intermediate quantum node 254 are provided to the border gateway cryptographic unit 253, which acts as a system endpoint and obtains the domain key, or any other relevant decryption key, through the QKD channels. This key is then used to decrypt the data traffic, which can be provided unencrypted on a local LAN 255. Traffic from the LAN to be sent out on the fibre ring is received at the network gateway 252 where it is encrypted, sent through fibre transmission gear to a further data optical add-drop multiplexer 256, where it can be added to any QKD traffic for outward transmission on the fibre ring.

FIG. 26 shows the use of this fibre ring arrangement in an extension of the network of FIG. 24. The network shown is illustrative—it has four nodes, two of which are data centres 261, 262 of the type shown in FIG. 24, and the other two are user endpoints 263, 264, both public data centres of the type shown in FIG. 24. Two fibre rings 265, 266 are provided for resilience—in general each ring will be provided with one fibre in each direction, there then being four fibres in the ring network in total. This network is clearly far sparser than will be found in practice—many more user endpoints would in practice be provided.

FIG. 27 shows a modification of the network of FIG. 26 with more extensive resilience provided in the data centres. This is provided by an intermediate quantum node for node on the fibre ring—in this example, a 10 port intermediate quantum node 271a, 271b is provided at each of the data centres 261, 262 and a 6 port intermediate quantum node 271c, 271d is provided at each user endpoint. This intermediate quantum node provides multiple connection possibilities to system components (such as server 272, storage elements such a RAID drives 273, user PCs 274, and gateway cryptographic units 278, and for the data centres QKD and administrator elements such as key management centre 275, KMS administrator PC 276 and NMS administrator PC 277).

Passive Optical Networks (PON)

As indicated above, extension of the principles indicated above will now be made to passive optical networks. In these networks, traffic is transmitted in encrypted form over the network as intermediate networks are public and may have multiple security domains. Data traffic is thus split from quantum traffic at different network points, and different multiplexers are used which multiplex and demultiplex data traffic with classical QKD traffic and quantum QKD traffic.

FIGS. 28A and 28B illustrate optical add-drop multiplexers used for passive optical networks—as will be noted, these are generally similar to those shown in FIGS. 5A and 5B with additional features to add in the data traffic. FIG. 28A illustrates a transmitter multiplexer 14 which receives a signal from a quantum channel, such as quantum transmitter 11, and combines it with classical signals. FIG. 28B illustrates a receiver multiplexer 15, which receives a signal containing both classical and quantum components, and resolves the quantum signal from it to provide to a quantum channel component such as quantum receiver 16.

FIG. 28A illustrates the multiplexing of all three of a data channel 53, a classical QKD channel 52 and a quantum QKD channel 51 on to a single optical fibre.

The data channel 53 and classical QKD channel 52 are combined at a first multiplexing filter 54. This acts as a band pass filter at $\lambda_C$ for the classical QKD channel, as shown in FIG. 29C. All of the light in the classical QKD channel 52 passes through the first multiplexing filter, whereas all the light in the data channel is reflected at the first multiplexing filter, resulting in a combined channel. This combined channel passes through a low-pass filter 55 and combines with the quantum QKD traffic as shown in FIG. 28A. The combined classical channels are joined with the quantum QKD channel at the second multiplexing filter 56. As shown in FIG. 29A, this is a bandpass filter for $\lambda_Q$, and will reflect light at $\lambda_C$ and $\lambda_{PON}$, so all three channels combine for output at output port 57. It should be noted that even if there is noise present in the quantum channel band in the combined classical signal, this should be cleaned from the signal by second multiplexing filter 56—such noise will be at $\lambda_Q$, and so will pass straight through the filter and will not be reflected to output port 57 as are the classical signals.

The arrangement shown in FIG. 28B is essentially similar, but in this case the quantum QKD channel 61 is to be dropped at the multiplexer from a composite classical and quantum signal. The composite signal is received at input port 60. The first demultiplexing filter 64—a bandpass filter for $\lambda_Q$, which may be the same component as second multiplexing filter 56—allows the quantum QKD channel 61 to pass through, while reflecting the two classical channels. There is no need to clean up the quantum QKD spectrum (as this signal has already been dropped), so this composite signal passes directly to the second demultiplexing filter 57, which is a band pass filter at $\lambda_C$, just like first multiplexing filter 54. The classical QKD channel 62 passes straight through this filter, while the data channel 63 is reflected by it.

FIG. 30 illustrates a more complex QKD network in generic terms and introduces a number of components which will be described in more detail below. Key management centre 301 is again central to the system, holding the master keys and effecting control over the other QKD elements in the system. Keys are distributed on to a passive optical network through a key distribution rack 102 which provides keys on to an optical network through a number of linecards 103. The optical network is used to transmit the keys to a number of endpoints 105a, 105b, 105c and 105d through a number of intermediate nodes 104a, 104b, 104c and 104d. Separate system elements will now be described where these differ from those required for conventional optical networks.

FIG. 31 provides an example of an end user endpoint—in this case, desktop unit 311 for incorporation in personal computer 310. The desktop unit 311 contains an optical add drop multiplexer 312 which first drops the network traffic for processing by a desktop networking unit 313. The endpoint classical QKD unit 314 receives classical QKD signals from the multiplexer (and provides generated classical QKD signals for transmission back to the preceding Alice unit to the multiplexer) and together with the endpoint quantum QKD receiver (Bob unit) 315 and incorporated key agreement logic establishes one or more keys with the preceding Alice (and thus directly or indirectly with the key management centre). At least one established key is used for encryption and/or decryption of network traffic. Desktop networking unit 313 provides encrypted traffic to a data traffic encryption unit within the QKD desktop unit 311, and this passes traffic to the PC 310. A tamperproof boundary 316 is placed around the Bob unit, and it can be seen from the description above that encryption keys never need to leave this boundary. The add-drop multiplexer 312 may be implemented, for example, using the functionality shown in FIG. 285b and described above. The desktop unit 311 also contains a security token 317 to provide an identity so that the desktop unit 311 can be authenticated (typically by a first exchange of encrypted data traffic once a key has been agreed by the relevant QKD protocol, as discussed above).

It should be noted that a PC used to administrate the key management system and/or the network management system of the QKD network may be of this type—messages may be passed back over the data network by standard means for transmission through the QKD network as necessary, and the only requirements on such an administrator PC are that it is as secure as is appropriate to the sensitivity of the information that may be obtained from it. It may however be desirable for an administrator PC to be located at an intermediate node, rather than a leaf node, to reduce the chances of it being isolated by a network fault.

Referring back to FIG. 30, it should be noted that intermediate quantum nodes 104 do not communicate directly with the key management centre 101. For such arrangements, an intermediate stage within the main server infrastructure supporting the network is required—in the network shown in FIG. 30, this is the key distribution rack 102, and further comprises linecards 103 to provide the signals on to the network.

While different network types may be employed in embodiments of the invention, the arrangement shown in FIG. 30 and FIGS. 32 and 33 is a passive optical network—in such a network, optical signals are passed through unpowered splitters outward from a central node (with return optical signals being combined similarly). Time division multiplexing, or another appropriate channel sharing technique, is used to ensure that bandwidth is available for communication on the different network paths required.

FIG. 32 shows a key distribution rack 320 for a passive optical network. Quantum and classical QKD signals are received from a key management centre through first optical switches 321 under control of an optical switching controller 322 interfacing with an electrical backplane through electrical switching controller 323. The key distribution rack 320 replicates the functionality of the classical and Bobice intermediate quantum nodes, but does so in a distributed fashion, with the classical QKD signal provided not at the card with quantum QKD functionality, but at a linecard 325 at which signals are provided to be sent out on to the passive optical network. This split allows the quantum QKD signals to be routed from a quantum QKD card 324a to an appropriate linecard, and for appropriate classical QKD signals to be added, through the electrical switching controller 323, to complement the quantum QKD signals. Similarly classical-only QKD cards 324b may be connected to linecards 325 for transmission of classical signals on paths where no quantum signal is required.

The key distribution rack 320 is used to provide synchronisation over the network—it is provided with a clock 326 which provides signals both to the classical QKD signal of the linecards and to the QKD cards. This clock signal is thus broadcast over the network, ensuring that the line rate is matched so that the endpoint Bob unit can synchronise the quantum signals accordingly.

Linecards 325 in FIG. 32 are shown as providing a single output to the passive optical network. More generally in a passive optical network, linecards will provide output to multiple fibres. A linecard 330 is shown in FIG. 33 which provides output to four optical fibres. The quantum QKD signal is received from a key distribution rack quantum QKD card 334a at a 1:4 optical switch 331 connected to electrical switch 323. This is controlled to provide the appropriate quantum QKD signal to any of the four fibre paths as required. The linecard 330 has four optical transponders 332a, 332b, 332c and 332d connected to the electrical switching controller 323 and the clock 326 of the key distribution rack—these provide classical QKD signals for combination with the quantum QKD signal, if present, at a respective optical add-drop multiplexer 333a, 333b, 333c or 333d. Data traffic to go out on the passive optical network is also added in at the multiplexer to provide the signal to go out on to the passive optical network through the relevant network fibre—signals travelling in the other direction (data signals and classical QKD signals but not quantum QKD signals) will travel in the other direction and be directed to the path for internal data traffic or to the classical QKD transponder as is determined by the signal wavelength.

This approach to network construction is shown in the following examples.

FIG. 34 shows an embodiment of aspects of the invention providing a simple star, or hub-and-spoke, network. The network centre 341 is the source of the domain key and the centre for all management, and distributes the key to assorted endpoints 344a to 344n via an N-way passive optical splitter 343. The domain key can then be used for encrypted data transmission between the endpoints on paths that do not pass through the network centre 341. An intermediate quantum node may be used instead of the passive optical splitter 343. This arrangement has no resilience or redundancy.

FIG. 35 shows an embodiment of aspects of the invention providing a passive optical network in which quantum key distribution is enabled. The central system elements—a key management centre 351, the network management system administration 352 and the key management system administration 353—are connected through a pair (for resilience) of intermediate quantum nodes 354a, 354b to a key distribution rack 355, provided with a number of linecards 356, which may be of the type described above. The linecards are provided with an optical add-drop multiplexer to overlay the QKD signals on to the data traffic to be carried on the passive optical network. Splitters 357 are provided downstream of the key distribution rack on the public network, the whole forming a star network terminating in user endpoints 358 where the domain key, or any other encryption key used, is received.

Again, a more complex arrangement than that shown in FIG. 35 may be used in practice—FIG. 36 shows an example of such an arrangement. In this multiple key distribution racks 365 are provided for increased resilience, and internal quantum nodes 369 are used to provide multiple connection possibilities for critical system components. The internal quantum nodes are connected via an internal fibre ring, with key distribution to users taking place at hubs on the internal fibre ring. Using this arrangement, backup for the key management centre and administration functions can be provided at a physically separate location from the main KMC, thus improving overall system resilience. This arrangement also shows how an optical QKD network can be readily developed to augment an existing local area network. Data transmission over an internal network may be over pre-existing components 361, which may even be a copper-wired system rather than a fibre optic one. Each key distribution rack 365 is associated with an optical line terminal 361 of the passive optical network, the passive optical network extending to user PCs.

The invention claimed is:

1. A fibre optic networking component comprising:
    at least one input for receiving an input signal from an input optical fibre;
    at least one output for providing an output signal to an output optical fibre;
    a first add drop multiplexer for splitting the input signal into an input quantum signal and an input classical signal, and a second add drop multiplexer for combining an output quantum signal with an output classical signal into the output signal;
    the fibre optic networking component having a first processing path for processing the input quantum signal into the output quantum signal and a second processing path for processing the input classical signal into the output classical signal, wherein the second processing path comprises processing logic to process the input classical signal and to produce the output classical signal.

2. A fibre optic networking component as claimed in claim 1 and further comprising a matrix of optical switches, wherein the fibre optic networking component comprises a plurality of outputs and wherein the matrix of optical switches is connected to the second processing path whereby the matrix of optical switches can be controlled by the second processing path in response to the input classical signal.

3. A fibre optic networking component as claimed in claim 1, wherein the input and output quantum signals are carried on a wavelength different from the wavelength on which the input and output classical signals are carried, and wherein at least one of the first and second add drop multiplexers includes one or more filters adapted to reflect the input and output classical signals and transmit the input and output quantum signals.

4. A fibre optic networking component as claimed in claim 1, wherein the second processing path comprises conversion of the input classical signal to a first electrical signal at a first transponder, processing of the first electrical signal and production of a second electrical signal by a component logic unit, and conversion of the second electrical signal to the output classical signal at a second transponder.

5. A fibre optic networking component as claimed in claim 4, wherein the fibre optic networking component is bidirectional for classical signals, whereby the fibre optic networking component is adapted to receive a second input classical signal at one of the at least one outputs, to convert the second input classical signal to a third electrical signal at the second transponder, to process the third electrical signal and generate a fourth electrical signal at the fibre optic networking component logic unit, and to convert the fourth electrical signal to a second output classical signal at the first transponder, and to transmit the second output classical signal at one of the at least one inputs.

6. A fibre optic networking component as claimed in claim 1, wherein the first processing path comprises one of (i) direct transmission of the input quantum signal one of the at least one outputs, or (ii) a quantum receiver and a quantum transmitter, and wherein the first processing path and the second processing path together provide key agreement logic, whereby the fibre optic networking component is adapted to agree a first key by quantum key distribution with a source of the input quantum signal and to agree a second key by quantum key distribution with a destination of the output quantum signal, and, optionally, the second key is partly or wholly determined by the source of the input quantum signal.

7. A fibre optic networking component as claimed in claim 1, wherein the first add drop multiplexer is adapted for splitting the input signal into an input data signal as well as an input quantum signal and an input classical signal, and the second add drop multiplexer is adapted for combining an output data signal as well as an output quantum signal and an output classical signal.

8. A method of distributing a key from a key generation node to a destination node by quantum key distribution, comprising the following steps at an intermediate node between the key generation node and the destination node:
    receiving an input signal from the key generation node;
    separating the input signal into a quantum signal at a first wavelength and a classical signal at a second wavelength or set of wavelengths,
    processing the classical signal to obtain first messaging information relating to a network connecting the key generation node and the destination node, processing the first messaging information, and generating a modified classical signal comprising second messaging information; and
    combining the quantum signal and the modified classical signal for transmission to the destination node.

9. A method of distributing a key as claimed in claim 8, wherein processing the first messaging information comprises configuring the intermediate node for routing the quantum signal and the modified classical signal to the destination node.

10. A method of distributing a key as claimed in claim 8, further comprising receiving a return classical signal from the destination node, processing the return classical signal to obtain third messaging information, processing the third messaging information and generating a modified return classical signal comprising fourth messaging information, and, optionally, wherein processing the third messaging information comprises configuring the intermediate node for routing the modified return classical signal to the key generation node.

11. A method of distributing a key as claimed in claim 10, wherein the step of separating the input signal further comprises separating out a data signal at a third wavelength or set of wavelengths from the quantum signal and the classical signal and wherein the step of combining signals to provide an output signal comprises combining in a data signal.

12. A method of distributing a key as claimed in claim 11, wherein the intermediate node is adapted to route the data signal independently of the quantum signal and the classical signal, and, optionally, the data signal in the input signal and the data signal in the output signal may be different data signals.

13. A fibre optic component comprising a set of optical switches, an optical switch controller, and one or more quantum key distribution modules, wherein each quantum key distribution module is provided with a first port and a second port each connected to the set of optical switches and is further provided with an electrical connection to the optical switch controller, wherein the optical switch controller is adapted to control the set of optical switches to route quantum key distribution signals in response to signals received from the one or more modules by means of the electrical connection, wherein each of the quantum key distribution modules is one of these quantum key distribution module types:
    a quantum signal transmission module in which a signal received in the first port is separated into a quantum signal and a classical signal, wherein the classical signal is processed to provide routing information to the optical switch controller and a modified classical signal is generated, and wherein the quantum signal and the modified classical signal are combined for transmission through the second port;
    a quantum signal regeneration module in which a signal received in the first port is separated into a quantum signal and a classical signal, wherein the quantum signal and the classical signal are processed to agree a first key with a source of the received signal and a new quantum signal is generated for transmission to a destination node, wherein the classical signal is processed to provide routing information to the optical switch controller and a modified classical signal associated with the new quantum signal is generated, and wherein the further quantum signal and the modified classical signal are combined for transmission through the second port; or
    a classical module in which a signal at the first port is treated as a classical signal and processed to provide routing information to the optical switch controller and a modified classical signal is generated, and wherein the modified classical signal is provided for transmission through the second port.

14. A fibre optic component as claimed in claim 13, wherein
    (i) each quantum key distribution module is adapted to be bidirectional in respect of classical signals, whereby a return classical signal received at the second port is processed to provide routing information to the optical switch controller and a modified return classical signal is generated, and wherein the modified return classical signal is provided for transmission through the first port,
    (ii) the connection between the first and second ports and the optical switch is an optical connection, and/or
    (iii) the set of optical switches can route the quantum key distribution signal to any one of two or more destination nodes.

15. A fibre optic component as claimed in claim 13, at least one of the quantum key distribution modules consisting of a quantum signal transmission module in which a signal received in the first port is separated into a quantum signal and a classical signal, wherein
    (i) the classical signal is processed to provide routing information to the optical switch controller and a modified classical signal is generated, and wherein the quantum signal and the modified classical signal are combined for transmission through the second port, or
    (ii) the quantum signal and the classical signal are processed to agree a first key with a source of the received signal and a new quantum signal is generated for transmission to a destination node, wherein the classical signal is processed to provide routing information to the optical switch controller and a modified classical signal associated with the new quantum signal is generated, and wherein the further quantum signal and the modified classical signal are combined for transmission through the second port.

16. A quantum key distribution module for use in a fibre optic component as claimed in claim 13, the quantum key distribution module consisting of a classical module in which a signal at the first port is treated as a classical signal and processed to provide routing information to the optical switch controller and a modified classical signal is generated, and wherein the modified classical signal is provided for transmission through the second port.

17. A fibre optic component as claimed in claim 15, wherein the quantum key distribution module is adapted to be bidirectional in respect of classical signals, whereby a return classical signal received at the second port is processed to provide routing information to the optical switch controller and a modified return classical signal is generated, and wherein the modified return classical signal is provided for transmission through the first port.

* * * * *